United States Patent
Niessner et al.

(10) Patent No.: US 10,815,367 B2
(45) Date of Patent: Oct. 27, 2020

(54) MOULDING COMPOSITIONS BASED ON VINYLAROMATIC COPOLYMERS FOR 3D PRINTING

(71) Applicant: INEOS STYROLUTION GROUP GMBH, Frankfurt am Main (DE)

(72) Inventors: Norbert Niessner, Friedelsheim (DE); Frank Eisentraeger, Cologne (DE); Stephanie Baumann, Wuerzburg (DE); Itana Lohse, Limburgerhorf (DE); Hans-Werner Schmidt, Bayreuth (DE); Josef Meiners, Krefeld (DE); Florian Wieberger, Aalen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 563 days.

(21) Appl. No.: 15/104,797

(22) PCT Filed: Dec. 18, 2014

(86) PCT No.: PCT/EP2014/078494
§ 371 (c)(1),
(2) Date: Jun. 15, 2016

(87) PCT Pub. No.: WO2015/091817
PCT Pub. Date: Jun. 25, 2015

(65) Prior Publication Data
US 2016/0312022 A1    Oct. 27, 2016

(30) Foreign Application Priority Data
Dec. 18, 2013 (EP) .................................... 13198147

(51) Int. Cl.
| | | |
|---|---|---|
| *C08L 25/12* | (2006.01) | |
| *B33Y 10/00* | (2015.01) | |
| *B33Y 40/00* | (2020.01) | |
| *B33Y 50/02* | (2015.01) | |
| *B33Y 70/00* | (2020.01) | |
| *B29C 64/118* | (2017.01) | |
| *C08F 279/04* | (2006.01) | |
| *B29K 25/00* | (2006.01) | |

(52) U.S. Cl.
CPC .............. *C08L 25/12* (2013.01); *B33Y 10/00* (2014.12); *B33Y 40/00* (2014.12); *B33Y 50/02* (2014.12); *B33Y 70/00* (2014.12); *C08F 279/04* (2013.01); *B29C 64/118* (2017.08); *B29K 2025/08* (2013.01)

(58) Field of Classification Search
CPC ........ C08L 25/12; C08L 279/04; B33Y 10/00; B33Y 40/00; B33Y 50/02; B33Y 70/00; B29C 64/118; B29C 2025/08

USPC .......................................................... 524/502
See application file for complete search history.

(56) References Cited

U.S. PATENT DOCUMENTS

| | | | |
|---|---|---|---|
| 3,530,094 A | 9/1970 | Schnell et al. | |
| 3,535,280 A | 10/1970 | Schnell et al. | |
| 4,537,949 A | 8/1985 | Schmidt et al. | |
| 4,540,772 A | 9/1985 | Pipper et al. | |
| 4,788,253 A | 11/1988 | Hambrecht et al. | |
| 6,323,279 B1* | 11/2001 | Guntherberg ......... | C08F 279/04 525/70 |
| 6,384,133 B1 | 5/2002 | Eichenauer | |
| 7,060,741 B2 | 6/2006 | Eichenauer et al. | |
| 2005/0003189 A1 | 1/2005 | Bredt et al. | |
| 2008/0071030 A1 | 3/2008 | Priedeman, Jr. | |
| 2009/0295032 A1 | 12/2009 | Hopkins | |

FOREIGN PATENT DOCUMENTS

| | | |
|---|---|---|
| CN | 1326475 A | 12/2001 |
| CN | 103246164 A | 8/2013 |
| DE | 1260135 B | 2/1968 |
| DE | 1495730 A1 | 4/1969 |
| DE | 1300266 B | 7/1969 |
| DE | 3149358 A1 | 6/1983 |
| DE | 102007061445 A1 | 6/2009 |
| EP | 0038094 B1 | 7/1984 |
| EP | 0129195 A2 | 12/1984 |
| EP | 0129196 A2 | 12/1984 |
| EP | 0038582 B1 | 8/1985 |
| EP | 0039524 B2 | 4/1989 |
| EP | 0993476 A1 | 4/2000 |
| EP | 1015215 B1 | 3/2008 |
| EP | 1087862 B1 | 6/2008 |
| EP | 1497093 B1 | 12/2011 |
| GB | 1124911 | 8/1968 |
| GB | 1472195 A | 5/1977 |
| JP | 2007051237 A | 3/2007 |
| KR | 10-2006-0022243 A | 3/2006 |
| WO | 01/01489 A1 | 1/2001 |
| WO | 01/62848 A1 | 8/2001 |

* cited by examiner

*Primary Examiner* — Kelechi C Egwim
(74) *Attorney, Agent, or Firm* — J.A. Lindeman & Co. PLLC

(57) ABSTRACT

Thermoplastic moulding composition for 3D printing containing a polymer mixture A made of components a and b: a being from 30 to 95% by weight of at least one vinylaromatic copolymer a with average molar mass Mw from 150 000 to 360 000 g/mol, b being from 5 to 70% by weight of at least one impact modifier b, where the viscosity of the moulding composition (measured in accordance with ISO 11443) at shear rates of from 1 to 10 l/sec and at a temperature of 250° C. is not higher than $1 \times 10^5$ Pa*s and the Melt Volume Rate (MVR, measured in accordance with ISO 1133 for 220° C. and 10 kg load) is more than 6 ml/10 min.

19 Claims, 1 Drawing Sheet

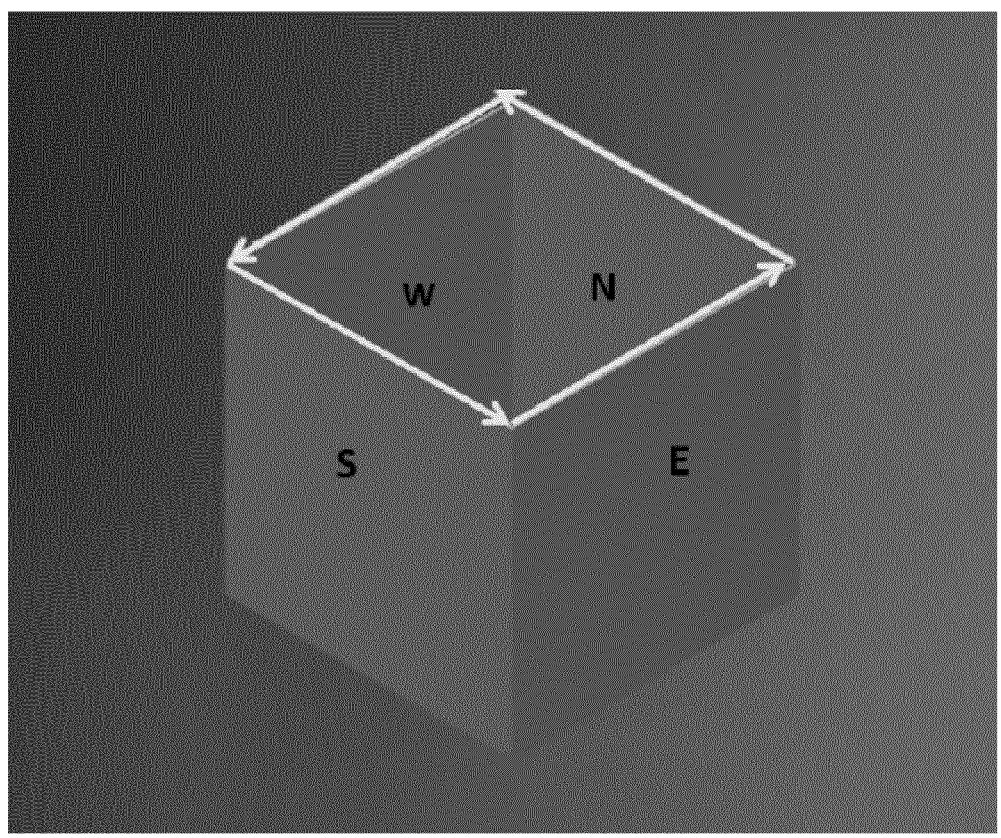

MOULDING COMPOSITIONS BASED ON VINYLAROMATIC COPOLYMERS FOR 3D PRINTING

The invention relates to molding compositions based on vinylaromatic copolymers having enhanced toughness/viscosity balance and to the use thereof for 3D printing.

The use of amorphous thermoplastics for 3D printing, especially of acrylonitrile-butadiene-styrene (ABS), is known. EP-A 1015215, for instance, describes a method for producing a three-dimensional object of predetermined shape from a material which can be consolidated thermally. For the 3D printing, the material is first fluidized and extruded, and two or more layers of the material are applied to a support, with movement, and then the shaped material is consolidated by cooling to below the solidification temperature of the material. Thermally consolidable material used comprises amorphous thermoplastics, especially acrylonitrile-butadiene-styrene (ABS).

EP-A 1087862 describes a rapid prototyping system for producing a three-dimensional article by extrusion and application of solidifiable thermoplastic modeling and support material in a plurality of layers. The thermoplastic material is supplied via a spool. ABS is cited as a suitable modelable material. As fragmentary support material, which is removed following completion of the 3D model, a mixture of ABS and a polystyrene copolymer as filling material with a fraction of up to 80% is used.

EP-A 1497093 describes a method for producing a prototype of a plastics injection molding from a thermoplastic material, which in fluidized form is injected into a mold until it fills the cavity of said mold and, after curing, forms the prototype. This prototype is produced via "Fused Deposition Modeling", a specific 3D printing method. The thermoplastic material is selected from: ABS, polycarbonate, polystyrene, acrylates, amorphous polyamides, polyesters, PPS, PPE, PEEK, PEAK, and mixtures thereof, with ABS being preferred. Contraction phenomena are avoided using preferably amorphous thermoplastics.

US 2008/0071030 describes a thermoplastic material which is used for producing three-dimensional models by multilayer deposition.

The thermoplastic material comprises a base polymer selected from the group consisting of: polyethersulfones, polyetherimides, polyphenylsulfones, polyphenylenes, polycarbonates, polysulfones, polystyrenes, acrylates, amorphous polyamides, polyesters, nylon, polyetheretherketones, and ABS, and 0.5 to 10 wt % of a silicone release agent. Preference as base polymer is given to using polyethersulfone and mixtures thereof with polystyrene (3 to 8 wt %). In order to avoid contraction, preference is given to using amorphous polymers and optionally customary filling materials.

US 2009/0295032 proposes modified ABS materials for 3D printing. The ABS materials are modified by additional monomers, oligomers or polymers, more particularly acrylates. Given as an example are MMA-modified ABS/poly(styrene-acrylonitrile) blends, more particularly CYCOLAC ABS MG 94. The proportions of the components and the viscosity of the blends are not specified.

The aforementioned materials, however, are often too brittle for 3D printing, and are deserving of improvement in relation both to toughness and to their odor. With the materials of the prior art, furthermore, the viscosity, under the conditions of the melt flow index at low shear rates, is often too high and is likewise deserving of improvement.

It is an object of the invention to provide improved, low-odor thermoplastic materials for 3-D printing with optimized toughness/viscosity balance. A further object of the present invention is to provide molding compositions for 3D printing that allow 3D printing by the fused deposition modeling method with a high extrusion rate. Another object of the invention is to provide molding compositions which are suitable for producing filaments of high dimensional stability for 3D printing. It is a further object of the invention, moreover, to provide molding compositions which have a high print quality when used in 3D printing by the fused deposition modeling method. The object has been achieved by means of molding compositions as described below and by the use thereof for 3D printing.

One subject of the invention is a thermoplastic molding composition for 3D printing, comprising a polymer mixture A composed of components a and b:

a: 30 to 95 wt % of at least one polymer a having an average molar mass Mw of 150 000 to 360 000 g/mol, selected from:
  vinylaromatic copolymers selected from the group consisting of: styrene-acrylonitrile copolymers, α-methylstyrene-acrylonitrile copolymers, styrene-maleic anhydride copolymers, styrene-phenyl-maleimide copolymers, styrene-methyl methacrylate copolymers, styrene-acrylonitrile-maleic anhydride copolymers, styrene-acrylonitrile-phenylmaleimide copolymers, α-methylstyrene-acrylonitrile-methyl methacrylate copolymers, α-methylstyrene-acrylonitrile-tert-butyl methacrylate copolymers, and styrene-acrylonitrile-tert-butyl methacrylate copolymers, b: 5 to 70 wt % of at least one impact modifier b, with b1:
  20-90 wt % of a graft base of one or more monomers, consisting of:
  b11: 10 to 100% of at least one further conjugated diene and/or at least one acrylate;
  b12: 0 to 30 wt % of at least one further comonomer selected from: styrene, α-methylstyrene, acrylonitrile, methacrylonitrile, MMA, MAN, and N-phenylmaleimide (N-PMI);
  b13: 0 to 10 wt % of one or more polyfunctional, crosslinking monomers which, if component b11 is acrylate, are to be present in amounts of at least 0.1 wt %,
  b2: 10 to 80 wt % of a graft of one or more monomers, consisting of:
  b21: 65 to 95 wt %, preferably 70 to 90 wt %, more particularly 72.5 to 85 wt %, more preferably 75 to 85 wt % of at least one vinylaromatic monomer, preferably styrene and/or α-methylstyrene, more particularly styrene;
  b22: 5 to 35 wt %, preferably 10 to 30 wt %, more particularly 15 to 27.5 wt %, often more preferably 15 to 25 wt %, of acrylonitrile and/or methacrylo-nitrile, preferably acrylonitrile,
  b23: 0 to 30 wt %, preferably 0 to 20 wt %, more preferably 0 to 15 wt % of at least one further monoethylenically unsaturated monomer selected from: MMA, MAN, and N-PMI;
  where the sum of a and b makes 100 wt %,
  characterized in that the viscosity (measured to ISO 11443) of the molding composition at shear rates of 1 to 10 l/s and at temperatures of 250° C. is not higher than $1 \times 10^5$ Pa*s and the melt volume rate (MVR, measured to ISO 1133 at 220° C. and 10 kg load) is more than 6 ml/10 min.

The sum of the amounts in wt % of components b11, b12, and optionally b13, and also the sum of the amounts in wt % of components b21, b22, and optionally b23, always make 100 wt %.

The weight-average molar mass Mw is determined by GPC (solvent: tetrahydrofuran, polystyrene as polymer standard) with UV detection.

For the purposes of the present invention, 3D printing means the production of three-dimensional moldings with the aid of an apparatus (3D printer) suitable for 3D printing.

In the molding composition of the invention, the fraction of the polymer mixture A is generally 40 to 100 wt %, preferably 70 to 100 wt %, very preferably 80 to 100 wt %, based on the overall molding composition.

The molding composition of the invention may optionally further comprise at least one further polymer B selected from polycarbonates, polyamides, poly(meth)acrylates, polyesters, and vinylaromatic-diene copolymers (SBC). The fraction of the polymer B is generally 0 to 60 wt %, preferably 0 to 30 wt %, more preferably 0 to 20 wt %, based on the overall molding composition. If polymer B is present in the molding composition, its minimum fraction is customarily 0.1 wt %.

Furthermore, the molding composition of the invention may optionally comprise customary additives and/or auxiliaries C. The fraction of the additives and/or auxiliaries C is generally 0 to 50 wt %, preferably 0.1 to 30, more preferably 0.2 to 10 wt %, based on the overall molding composition. If additives and/or auxiliaries C are present in the molding composition, their minimum fraction is customarily 0.1 wt %.

The sum of the components A and optionally B and/or C present in the overall molding composition makes 100 wt %.

Preference is given to a molding composition of the invention comprising or consisting of components A, B, and C.

With further preference, the molding composition used in accordance with the invention comprises substantially amorphous polymers, meaning that in other words at least half (at least 50 wt %) of the polymers present in the molding composition are amorphous polymers.

Polymer Mixture A

In the polymer mixture A, the fraction of the polymer a is preferably 40 to 90 wt % and the fraction of the impact modifier b is preferably 60 to 10 wt %. More preferably, in the polymer mixture A, the fraction of the polymer a is 50 to 80 wt % and the fraction of the impact modifier b is 50 to 20 wt %. Very preferably, in the polymer mixture A, the fraction of the polymer a is 60 to 75 wt % and the fraction of the impact modifier b is 40 to 25 wt %.

According to a further preferred embodiment, particularly for 3D printing with a high extrusion rate, the fraction of polymer a in the polymer mixture A is preferably 75 to 95 wt %, and the fraction of impact modifier b in the polymer mixture A is preferably 5 to 25 wt %; more preferably, in the polymer mixture A, the fraction of the polymer a is 80 to 90 wt % and the fraction of the impact modifier b is 10 to 20 wt %. In the case of this embodiment, the fraction of the polymer a in the polymer mixture A may also be 100 wt %.

A high extrusion rate for the purposes of the present invention means that filaments of the molding composition of the invention in accordance with the aforementioned embodiment, in a 3D printer having a heating nozzle with a diameter of 0.3 to 0.8 mm, preferably 0.35 to 0.45 mm, more preferably 0.4 mm, are melted at a nozzle temperature of 200 to 270° C., preferably 230 to 250° C., very preferably 240° C., and the melted molding composition is extruded at a rate of 60 to 180 mm/s, preferably 80 to 160 mm/s, more preferably 100 to 140 mm/s.

The aforementioned 3D printer is more particularly a 3D printer that is suitable for the fused deposition modeling (FDM) method.

The FDM method is a fusion layering method wherein filaments of a molding composition suitable for 3D printing are fluidized by heating in the 3D printer, after which the fluidized molding composition is applied layer by layer to a moving construction platform (printing bed) or to a previous layer of the molding composition, by extrusion with a heating nozzle which is freely movable within the fabrication plane, and then the shaped material is consolidated, optionally by cooling.

According to a further preferred embodiment, particularly for 3D printing in higher print quality, the fraction of the polymer a in the polymer mixture A is preferably 65 to 95 wt %, and the fraction of the impact modifier b in the polymer mixture A is preferably 5 to 35 wt %.

More preferably in the polymer mixture A, the fraction of the polymer a is 70 to 90 wt % and the fraction of the impact modifier b is 10 to 30 wt %, and very preferably, in the polymer mixture A, the fraction of the polymer a is 75 to 90 wt % and the fraction of the impact modifier b is 10 to 25 wt %.

High print quality for the purposes of the present invention means that a 3-dimensional body produced or printed by means of the fused deposition molding 3D printing method is distinguished by effective bed adhesion, no stringing, freedom from warping, dimensional stability, and a high contact area between the layers (high layer adhesion).

According to another preferred embodiment, especially for producing filaments with high dimensional stability for 3D printing, in the polymer mixture A, the fraction of the polymer a is preferably 30 to 60 wt % and the fraction of the impact modifier b is 40 to 70 wt %; more preferably, in the polymer mixture A, the fraction of the polymer a is 40 to 60 wt % and the fraction of the impact modifier b is 40 to 60 wt %; very preferably, in the polymer mixture A, the fraction of the polymer a is 50 to 60 wt % and the fraction of the impact modifier b is 40 to 50 wt %.

A high dimensional stability of a filament for 3D printing means, for the purposes of the present invention, that the resulting average diameter of the filament deviates from the setpoint diameter of the filament by at most +/−0.04 mm, preferably at most +/−0.035 mm, more preferably at most +/−0.025 mm, and the ovality of the filament is <0.03 mm, preferably <0.02 mm, very preferably ≤0.01 mm. The setpoint diameter selected for the filament is preferably a diameter of 1.50 to 3.20 mm, and more preferably it is 1.70 to 1.80 or 2.80 to 3.00, very preferably 1.75 to 1.80 mm or 2.85 to 3.00.

If the molding composition of the invention comprises as additive C no amounts or small amounts (0 to 10 wt %, based on the overall molding composition) of minerals such as fibrous and pulverulent filling and reinforcing agents and/or pigments, then preferably, in the polymer mixture A, the fraction of the polymer a is 70 to 95 wt % and the fraction of the impact modifier b is 5 to 30 wt %.

Polymer a

Polymer a forms a hard phase with a glass transition temperature Tg of >20° C.

The weight-average molar masses Mw of the polymer a are customarily 150 000 to 360 000 g/mol, preferably 150 000 to 300 000 g/mol, more preferably 150 000 to 270 000 g/mol, very preferably 150 000 to 250 000 g/mol, more particularly 150 000 to 220 000 g/mol.

Employed as polymer a in accordance with the invention are vinylaromatic copolymers selected from the group consisting of: styrene-acrylonitrile copolymers, α-methylstyrene-acrylonitrile copolymers, styrene-maleic anhydride copolymers, styrene-phenylmaleimide copolymers, styrene-methyl methacrylate copolymers, styrene-acrylonitrile-maleic anhydride copolymers, styrene-acrylonitrile-phenylmaleimide copolymers, α-methylstyrene-acrylonitrile-methyl methacrylate copolymers, α-methylstyrene-acrylonitrile-tert-butyl methacrylate copolymers, and styrene-acrylonitrile-tert-butyl methacrylate copolymers.

Further suitable in accordance with the invention as polymer a are also styrene-acrylonitrile copolymers and/or α-methylstyrene-acrylonitrile copolymers which comprise methyl acrylate, ethyl acrylate or n-butyl acrylate as further comonomer.

The aforementioned polymers a are preferably amorphous polymers. Used with preference as polymer a are styrene-acrylonitrile copolymers (SAN), styrene-methyl methacrylate copolymers (SMMA) and/or styrene-maleic anhydride copolymers (SMAN). Particularly preferred are styrene-acrylonitrile copolymers.

SAN copolymers and α-methylstyrene-acrylonitrile copolymers (AMSAN) used as polymer a in accordance with the invention contain generally 18 to 35 wt %, preferably 20 to 32 wt %, more preferably 22 to 30 wt % of acrylonitrile (AN), and 82 to 65 wt %, preferably 80 to 68 wt %, more preferably 78 to 70 wt % of styrene (S) or α-methylstyrene (AMS), where the sum of styrene or α-methylstyrene and acrylonitrile makes 100 wt %.

The SAN and AMSAN copolymers used generally have an average molar mass Mw of 150 000 to 350 000 g/mol, preferably 150 000 to 300 000 g/mol, more preferably 150 000 to 250 000 g/mol, and very preferably 150 000 to 200 000 g/mol.

SMMA copolymers used as polymer a in accordance with the invention contain generally 18 to 50 wt %, preferably 20 to 30 wt %, of methyl methacrylate (MMA), and 50 to 82 wt %, preferably 80 to 70 wt %, of styrene, where the sum of styrene and MMA makes 100 wt %.

SMSA copolymers used as polymer a in accordance with the invention contain generally 10 to 40 wt %, preferably 20 to 30 wt %, of maleic anhydride (MAN), and 60 to 90 wt %, preferably 80 to 70 wt %, of styrene, where the sum of styrene and MAN, makes 100 wt %.

The polymer a has a viscosity number VN (determined to DIN 53 726 at 25° C. on a 0.5 wt % strength solution of the polymer a in dimethylformamide) of 50 to 120, preferably 52 to 100, and more preferably 55 to 80 ml/g. The polymers a are obtained in a known way by bulk, solution, suspension, precipitation or emulsion polymerization, with bulk and solution polymerization being preferred. Details of these processes are described for example in Kunststoffhandbuch, edited by R. Vieweg and G. Daumiller, volume 4 "Polystyrol", Carl-Hanser-Verlag Munich 1996, p. 104 ff, and also in "Modern Styrenic Polymers: Polystyrenes and Styrenic Copolymers" (Eds., J. Scheirs, D. Priddy, Wiley, Chichester, UK, (2003), pages 27 to 29) and in GB-A 1472195.

Suitable SAN copolymers are commercial SAN copolymers such as Luran® from Styrolution, for example. Preferred SAN copolymers are those having an S/AN ratio (in weight percent) of 81/19 to 67/33 and a MVR (measured to ISO 1133 at 220° C. and 10 kg load) of at least 10 ml/10 min such as Luran 368, for example. Further preferred are SAN copolymers having an S/AN ratio (in weight percent) of 81/19 to 65/35 and a MVR (measured to ISO 1133 at 220° C. and 10 kg load) of at least 8 ml/10 min such as Luran M60, Luran VLL1970, Luran 25100, Luran VLP, and Luran VLR, for example; particularly preferred among the aforementioned SAN copolymers are those having a MVR of at least 10 ml/10 min.

Impact Modifier b

The impact modifier b used in accordance with the invention forms a soft phase having a glass transition temperature Tg of <0° C., preferably <−20° C., more preferably <−40° C.

The particle size of the impact modifiers b used in accordance with the invention is generally at least 50 nm and at most 10 μm, preferably 60 nm to 5 μm, more preferably 80 nm to 3 μm, very preferably 80 nm to 2 μm. The particle size here refers to the average particle diameter $d_{50}$.

The average particle diameter $d_{50}$ can be determined via ultracentrifuge measurement (cf. W. Scholtan, H. Lange: Kolloid Z. u. Z. Polymere 250, p. 782 to 796 (1972)).

One particular embodiment uses impact modifier b with bimodal, trimodal or multimodal particle size distributions.

Used in accordance with the invention is at least one impact modifier b, with b1: 20 to 90 wt %, preferably 40 to 90 wt %, more preferably 45 to 85 wt %, very preferably 50 to 80 wt %, of a graft base of one or more monomers, consisting of:

b11: 70 to 100 wt %, preferably 75 to 100 wt %, more preferably 80 to 100 wt %, of at least one conjugated diene, more particularly butadiene, and/or at least one acrylate, more particularly n-butyl acrylate and/or 2-ethylhexyl acrylate, b12: 0 to 30 wt %, preferably 0 to 25 wt %, more preferably 0 to 20 wt %, of at least one further comonomer selected from: styrene, α-methylstyrene, acrylonitrile, methacrylonitrile, MMA, MAN, and N-phenylmaleimide (N-PMI), preferably styrene and α-methylstyrene, more preferably styrene;

b13: 0 to 10 wt %, preferably 0.01 to 5, more preferably 0.02 to 2 wt %, of one or more polyfunctional, crosslinking monomers which, if component b11 is acrylate, are to be present in amounts of at least 0.1 wt %, b2: 10 to 80 wt %, preferably 10 to 60, more preferably 15 to 55 wt %, very preferably 20 to 50 wt %, of a graft of one or more monomers, consisting of:

b21: 65 to 95 wt %, preferably 70 to 90 wt %, more particularly 72.5 to 85 wt %, often more preferably 75 to 85 wt % of at least one vinylaromatic monomer, preferably styrene and/or α-methylstyrene, more particularly styrene;

b22: 5 to 35 wt %, preferably 10 to 30 wt %, more particularly 15 to 27.5 wt %, often more preferably 15 to 25 wt % of acrylonitrile and/or methacrylonitrile, preferably acrylonitrile, b23: 0 to 30 wt %, preferably 0 to 20 wt %, more preferably 0 to 15 wt % of at least one further monoethylenically unsaturated monomer selected from: MMA, MAN, and N-PMI, preferably MMA.

The aforementioned impact modifiers b are preferably acrylonitrile-butadiene-styrene (ABS) and/or acrylo-nitrile-styrene-acrylate (ASA) impact modifiers.

The impact modifier b used in accordance with the invention is more preferably an ABS impact modifier b with b1: 40 to 90 wt % of a graft base consisting of:

b11: 70 to 100 wt %, preferably 90 to 100 wt %, often preferably 90 to 99.9 wt %, often more preferably 90 to 99 wt % of butadiene, b12: 0 to 30 wt %, preferably 0 to 10 wt %, often preferably 0.1 to 10 wt %, often more preferably 1 to 10 wt % of styrene, and b2: 10 to 60 wt % of a graft consisting of:

b21: 65 to 95 wt %, preferably 70 to 90 wt %, more particularly 72.5 to 85 wt % of styrene, b22: 5 to 35 wt %, preferably 10 to 30 wt %, more particularly 15 to 27.5 wt % of acrylonitrile, and b23: 0 to 30 wt % of MMA.

The acrylate rubbers b1 are generally alkyl acrylate rubbers of one or more C4-C8 alkyl acrylates, with preference being given to at least partial use of butyl, hexyl, octyl or 2-ethylhexyl acrylate. These alkyl acrylate rubbers may comprise in copolymerized form up to 30 wt % of monomers that form hard polymers, such as styrene, α-methylstyrene, acrylonitrile, methacrylonitrile, MMA, MAN, and N-phenylmaleimide.

Acrylonitrile-styrene-acrylate rubbers (ASA) are preferred. The acrylate rubbers additionally contain up to 10 wt %, preferably 1 to 5 wt %, of polyfunctional crosslinking monomers b13 (crosslinking monomers). Examples of such are monomers which contain two or more double bonds capable of copolymerization, such as ethylene glycol diacrylate, butanediol diacrylate, hexanediol diacrylate, ethylene glycol dimethacrylate, butanediol dimethacrylate, hexanediol dimethacrylate, divinylbenzene, diallyl maleate, diallyl fumarate, diallyl phthalate, diallyl cyanurate, trisallyl cyanurate, esters of tricyclodecenyl alcohol such as tricyclodecenyl acrylate, dihydrodicyclopentadienyl acrylate, diallyl phosphate, allyl acrylate, allyl methacrylate, and dicyclopentadienyl acrylate (DCPA). Preference is given to using esters of tricyclodecenyl alcohol, divinylbenzene, allyl (meth)acrylate and/or trisallyl cyanurate.

Conjugated dienes b11 contemplated are dienes having 4 to 8 carbon atoms such as butadiene, isoprene, piperylene, and chloroprene or mixtures thereof. Preference is given to using butadiene or isoprene or mixtures thereof, very preferably butadiene.

Diene rubbers b1 are, for example, homopolymers of the aforementioned conjugated dienes b11, copolymers of such dienes b11 with one another, copolymers of such dienes with acrylates b11, more particularly n-butyl acrylate, and copolymers of such dienes with the comonomers b12 selected from styrene, α-methylstyrene, acrylonitrile, methacrylonitrile, methyl methacrylate (MMA), maleic anhydride (MAN), and N-phenylmaleimide (N-PMI). The diene rubbers may also contain polyfunctional monomers b13 with crosslinking effect, as stated above for the acrylate rubbers b1.

Preferred diene rubbers are commercial butadiene, butadiene-styrene, butadiene-methyl methacrylate, butadiene-n-butyl acrylate, butadiene-acrylonitrile, and acrylonitrile-butadiene-styrene rubbers (ABS); particularly preferred are ABS rubbers; especially preferred for use as diene rubber b1 is a butadiene rubber.

Preferred diene rubbers b1 and ABS impact modifiers b of these kinds are described in EP 0 993 476 B1. Particularly preferred diene rubbers b1 and ABS impact modifiers b are described in publication WO 01/62848.

The soft component is preferably a copolymer of multi-stage construction ("core/shell morphology"). For example, an elastomeric core (glass transition temperature Tg<50° C.) may be enveloped by a "hard" shell (polymers with Tg>50° C.), or vice versa. Core/shell graft copolymers of such kinds are known.

Methods for producing the impact modifiers b are known to the skilled person and described in the literature. Some corresponding products are available commercially. Preparation by emulsion polymerization has proven particularly advantageous (DE-C 12 60 135, EP 0 993 476 B1, and WO 01/01489).

Polymerization is carried out customarily at 20 to 100° C., preferably 30 to 80° C. In general, customary emulsifiers are used as well, examples being alkali metal salts of alkylsulfonic or alkylarylsulfonic acids, or alkyl sulfates, fatty alcohol sulfonates, salts of higher fatty acids having 10 to 30 carbon atoms, sulfosuccinates, ethersulfonates, or resin soaps. Preference is given to taking the alkali metal salts, more particularly the Na and K salts, of alkyl-sulfonates or fatty acids having 10 to 18 carbon atoms.

In general the emulsifiers are used in amounts of 0.5 to 5 wt %, more particularly of 0.5 to 3 wt %, based on the monomers used in the preparation of the graft base b1.

The dispersion is preferably prepared using water in an amount such that the completed dispersion has a solids content of 20 to 50 wt %. It is usual to operate at a water/monomer ratio of 2:1 to 0.7:1.

Radical initiators suitable for initiating the polymerization reaction are all those which decompose at the selected reaction temperature, in other words not only those which decompose by heat alone but also those which do so in the presence of a redox system. Polymerization initiators contemplated are preferably radical initiators, examples being peroxides such as preferably peroxosulfates (for instance, sodium or potassium persulfate), and azo compounds such as azodiisobutyronitrile. It is, though, also possible to use redox systems, especially those based on hydro-peroxides such as cumene hydroperoxide.

The polymerization initiators are used generally in an amount of 0.1 to 1 wt %, based on the graft base monomers a11) and a12).

The radical initiators and the emulsifiers too are added to the reaction mixture, for example, discontinuously as the total amount at the start of the reaction, or divided into a plurality of portions, batchwise, at the start and at one or more later times, or continuously, over a defined time interval. Continuous addition may also take place along a gradient, which may for example be ascending or descending, linear or exponential, or else staged (step function).

Furthermore, accompanying use may be made of chain transfer agents such as, for example, ethylhexyl thio-glycolate, n- or tert-dodecyl mercaptan or other mercaptans, terpinols, and dimeric alpha-methylstyrene, or other compounds suitable for regulating the molecular weight. The chain transfer agents are added continuously or discontinuously to the reaction mixture, as described above for the radical initiators and emulsifiers.

In order to maintain a constant pH, situated preferably at 6 to 9, it is possible for buffer substances to be used such as $Na_2HPO_4/NaH_2PO_4$, sodium hydrogencarbonate, or buffers based on citric acid/citrate. Chain transfer agents and buffer substances are used in the customary amounts, and so further details are unnecessary.

In one particularly preferred embodiment, a reducing agent is added during the grafting of the graft base b1 with the monomers b21) to b23).

The graft base b1, in one particular embodiment, may also be prepared by polymerizing the monomers b11) to b13) in the presence of a finely divided latex ("seed latex mode" of polymerization). This latex is included in the initial charge and may consist of monomers that form rubber-elastic polymers, or else of other monomers, as already stated. Suitable seed latices consist for example of polybutadiene or polystyrene.

In the case of the seed polymerization technique, it is usual first to prepare a finely divided polymer, preferably a polybutadiene, as seed latex and then to continue polymerization by ongoing reaction with butadiene-containing monomers to form larger particles (see, for example, Houben Weyl, Methoden der Organischen Chemie, Makromolekulare Stoffe [Macromolecular compounds] Part 1, p. 339 (1961), Thieme Verlag Stuttgart). Operation in this case is carried out preferably using the seed batch method or the seed feed method.

Through the use of seed latices—especially polybutadiene seed latices—having an average particle diameter $d_{50}$ of 25 to 200 nm, preferably of 30 to 180 nm, and more preferably of 60 to 170 nm, polybutadiene latices b1 having an average particle diameter $d_{50}$ of 200 to 600 nm, preferably 230 to 480 nm, more preferably of 240 to 470 nm, very preferably of 250 to 460 nm, can be obtained.

Where seed latices are used that have average particle diameters $d_{50}$ of more than 80 nm, preferably more than 90 nm, and more preferably more than 100 nm, the seed latices themselves are also prepared preferably by seed polymerization. This is done using preferably seed latices having average particle diameters $d_{50}$ of 10 to 60 nm, preferably 20 to 50 nm.

Preferred graft bases b1 and graft copolymers and/or impact modifiers b can be obtained by the seed polymerization technique described in document WO 01/62848A1.

In another preferred embodiment, the graft base b1 may be prepared by what is called a feed process. With this process, a certain fraction of the monomers b11) to b13) is introduced as an initial charge and the polymerization is initiated, after which the remainder of the monomers b11) to b13) ("feed fraction") are added as a feed during the polymerization.

The feed parameters (gradient design, quantity, duration, etc.) are dependent on the other polymerization conditions. Here as well, mutatis mutandis, the observations apply that were made in relation to the mode of addition of the radical initiator and the emulsifier. With the feed process, the fraction of the monomers a1) that is included in the initial charge is preferably 5 to 50, more preferably 8 to 40 wt %, based on b1. The feed fraction of b11) to b13) is run in preferably over the course of 1-18 hours, more particularly 2-16 hours, especially 4 to 12 hours.

Also suitable, furthermore, are graft polymers having a plurality of "soft" and "hard" shells, with a construction, for example, of b1)-b2)-b1)-b2), or b2)-b1)-b2), especially in the case of relatively large particles.

The precise polymerization conditions, particularly the nature, quantity, and metering of the emulsifier and of the other polymerization auxiliaries, are preferably selected such that the resulting graft copolymer latex, i.e., the impact modifier b, has an average particle size, defined by the $d_{50}$ of the particle size distribution, of 80 to 1000 nm, preferably 85 to 600 nm, and more preferably 90 to 500 nm.

The reaction conditions are harmonized with one another such that the polymer particles have a bimodal particle size distribution, in other words a size distribution having two more or less pronounced maxima. The first maximum is more significantly pronounced (comparatively narrow peak) than the second, and is situated in general at 25 to 200 nm, preferably 60 to 170 nm, more preferably 70 to 150 nm. The second maximum is comparatively broad and is situated in general at 150 to 800 nm, preferably 180 to 700 nm, more preferably 200 to 600 nm.

The second maximum (150 to 800 nm) here is situated at larger particle sizes than the first maximum (25 to 200 nm).

According to one preferred embodiment of a bimodal particle size distribution, the first maximum (b1') of the graft base b1 is situated at an average particle size $d_{50}$ of 25 to 200 nm, preferably 30 to 180 nm, more preferably 60 to 170 nm, and the second maximum (b1") of the graft base b1 is situated at an average particle size $d_{50}$ of 230 to 480 nm, very preferably 240 to 470 nm, especially preferably 250 to 460 nm.

According to one particularly preferred embodiment, the particle size distribution of the graft base b1 is trimodal: the first maximum (b1') of the graft base b1 is situated at an average particle size $d_{50}$ of 25 to 200 nm, preferably 30 to 180 nm, more preferably 60 to 170 nm, and the second maximum (b1") of the graft base b1 is situated at an average particle diameter $d_{50}$ of 230 to 330 nm, preferably of 240 to 320 nm, and more preferably of 250 to 310 nm, and the third maximum (b1''') possesses an average particle diameter $d_{50}$ of 340 to 480 nm, preferably of 350 to 470 nm, and more preferably of 360 to 460 nm.

The bimodal particle size distribution is obtained preferably by means of (partial) agglomeration of the polymer particles. The approach taken for this may be as follows, for example: the monomers b11) to b13), which construct the core, are polymerized to a conversion of customarily at least 90%, preferably greater than 95%, based on the monomers used. This conversion is generally reached after 4 to 20 hours. The resulting rubber latex has an average particle size $d_{50}$ of at most 200 nm and a narrow particle size distribution (virtually monodisperse system).

In the second stage, the rubber latex is agglomerated. This is generally done by adding a dispersion of an acrylic ester polymer. Preference is given to using dispersions of copolymers of C1-C4 alkyl esters of acrylic acid, preferably of ethyl acrylate, with 0.1 to 10 wt % of monomers that form polar polymers, such as acrylic acid, methacrylic acid, acrylamide or methacrylamide, N-methylolmethacrylamide or N-vinyl-pyrrolidone, for example. Particularly preferred is a copolymer of 96% ethyl acrylate and 4% methacrylamide. The agglomerating dispersion may optionally also comprise two or more of the stated acrylic ester polymers.

The concentration of the acrylic ester polymers in the dispersion used for the agglomeration is in general to be between 3 and 40 wt %. In the agglomeration, 0.2 to 20, preferably 1 to 5, parts by weight of the agglomerating dispersion are used per 100 parts of the rubber latex, calculated in each case on solids. The agglomeration is carried out by adding the agglomerating dispersion to the rubber. The rate of addition is normally not critical, with addition lasting generally for about 1 to 30 minutes at a temperature between 20 and 90° C., preferably between 30 and 75° C.

Apart from by means of an acrylic ester polymer dispersion, the rubber latex may also be agglomerated by other agglomerating agents such as acetic anhydride, for example. Also possible is agglomeration by pressure or freezing (pressure or freeze agglomeration). The methods stated are known to the skilled person.

Under the conditions stated, only some of the rubber particles are agglomerated, producing a bimodal distribution. After the agglomeration here, generally more than 50%, preferably between 75 and 95% of the particles (numerical distribution) are present in the unagglomerated state. The partly agglomerated rubber latex obtained is comparatively stable, and so it can readily be stored and transported without coagulation occurring.

In order to obtain a bimodal particle size distribution of the graft copolymer b, it is also possible to prepare two different graft polymers b' and b", which differ in their average particle size, in a customary way separately from one another, and to combine the graft copolymers b' and b" in the desired quantitative ratio. This variant is preferred in accordance with the invention.

In order to obtain a trimodal particle size distribution of the graft copolymer b, it is also possible to carry out conventional preparation of two different graft bases b1' and b1", differing in their average particle size, separately from one another, to combine the graft bases in the desired ratio prior to grafting (or else, optionally, afterward), and then to graft on the graft and subsequently to add, in the desired quantitative ratio, a third, separately prepared, graft copolymer b''' to the resultant graft copolymers b' and b", this copolymer b''' differing from b' and b" in terms of its average particle size. The aforementioned graft copolymer b is preferably a mixture of different ABS graft polymers b' and b" or, preferably, b', b", and b'''.

In the case of a bimodal particle size distribution, the impact modifier is preferably a mixture of ABS graft copolymers b' and b", with the graft base b1' of the ABS graft copolymer b' customarily having an average particle size $d_{50}$ of 25 to 200 nm, preferably 30 to 180 nm, more preferably 60 to 170 nm, and the graft base b1" of the ABS graft copolymer b" possessing an average particle size $d_{50}$ of 230 to 480 nm, very preferably 240 to 470 nm, especially preferably 250 to 460 nm.

The impact modifier b with particular preference has a trimodal particle size distribution and is a mixture of ABS graft copolymers b', b", and b''', with the graft base b1' of the ABS graft copolymer b' having an average particle diameter $d_{50}$ of 25 to 200 nm, preferably 30 to 180 nm, more preferably 60 to 170 nm, the graft base b1" of the ABS graft copolymer b" having an average particle diameter $d_{50}$ of 230 to 330 nm, preferably of 240 to 320 nm, and more preferably of 250 to 310 nm, and the graft base b1''' of the ABS graft copolymer b''' possessing an average particle diameter $d_{50}$ of 340 to 480 nm, preferably of 350 to 470 nm, and more preferably of 360 to 460 nm.

The graft bases b1', b1", and b1''' are preferably butadiene homopolymers and the respective graft b2 is preferably a SAN copolymer.

The graft copolymers b', b", and b''' are used in a graft copolymer b': sum of the graft copolymers b" and b''' ratio by weight of generally 75:25 to 50:50, preferably 70:30 to 55:45, more preferably 65:35 to 57:43, more particularly 60:40.

Particularly preferred is a mixture of aforementioned graft copolymers b' and b" or b', b", and b''' in which the respective graft base b1' and b1" or b1', b1", and b1''' has been prepared by seed polymerization.

The graft base b1" generally has an average particle diameter $d_{50}$ of 230 to 330 nm, preferably of 240 to 320 nm, and more preferably of 250 to 310 nm.

The gel content of b1" is generally 30 to 80 wt %, preferably 40 to 75 wt %, and more preferably 45 to 70 wt %.

The graft base b1''' generally has an average particle diameter $d_{50}$ of 340 to 480 nm, preferably of 350 to 470 nm, and more preferably of 360 to 460 nm.

The gel content of b1''' is generally 50 to 95 wt %, preferably 55 to 90 wt %, and more preferably 60 to 85 wt %.

Very preferably the seed polymerization of the graft base of the graft bases b1" and b1''' takes place using at least one polybutadiene seed latex having an average particle diameter $d_{50}$ of 25 to 200 nm, preferably of 30 to 180 nm, and more preferably of 60 to 170 nm.

The graft base b1' generally possesses an average particle diameter $d_{50}$ of 25 to 200 nm, preferably 30 to 180 nm, more preferably 60 to 170 nm.

Very preferably the seed polymerization of the graft base b1' takes place using at least one polybutadiene seed latex having an average particle diameter $d_{50}$ of 10 to 60 nm, preferably 20 to 50 nm.

The gel content of the graft base b1' is 30 to 98 wt %, preferably 40 to 95 wt %, and more preferably 50 to 92 wt %.

The average particle diameter $d_{50}$ can be determined by ultracentrifuge measurement (cf. W. Scholtan, H. Lange: Kolloid Z. u. Z. Polymere 250, pp. 782 to 796 (1972)); the values reported for the gel content are based on determination via the wire cage method in toluene (cf. Houben-Weyl, Methoden der Organischen Chemie, Makromolekulare Stoffe [Macromolecular Compounds], part 1, p. 307 (1961), Thieme Verlag Stuttgart).

The gel contents can be adjusted in a manner known in principle through application of suitable reaction conditions (e.g., high reaction temperature and/or polymerization to a high conversion, and, optionally, addition of crosslinking substances to obtain a high gel content, or, for example, low reaction temperature and/or termination of the polymerization reaction prior to excessive crosslinking, and also, optionally, addition of chain transfer agents, to achieve a low gel content).

Mixtures of the aforementioned graft copolymers b', b", and b''' used in accordance with the invention, and the preparation of the graft bases thereof by seed polymerization, are described in WO 01/62848 A1.

Through the choice of the reaction conditions, the polymerization of the graft base b1 is customarily conducted in such a way as to result in a graft base having a defined crosslinking state. Examples of parameters essential for this are the reaction temperature and reaction time, the ratio of monomers, chain transfer agents, radical initiators, and, in the case of the feed process, for example, the feed rate and the amount and timing of addition of chain transfer agent and initiator.

One method for characterizing the state of crosslinking of crosslinked polymer particles is the measurement of the swelling index SI, which is a measure of the swellability by a solvent of a polymer with greater or lesser crosslinking. Examples of customary swelling agents are methyl ethyl ketone or toluene. The SI of the molding compositions of the invention is situated customarily in the SI=10 to 60 range, preferably 15 to 55, and more preferably 20 to 50.

Another method for characterizing the state of crosslinking is to measure NMR relaxation times of the mobile protons, referred to as T2 times. The greater the crosslinking of a particular network, the lower its T2 times. Customary T2 times for the graft bases b1 of the invention are T2 times in the 2.0 to 4.5 ms range, preferably 2.5 to 4.0 ms, and more preferably 2.5 to 3.8 ms, measured on filmed samples at 80° C.

A further measure for characterizing the graft base and the state of crosslinking thereof is the gel content, in other words that fraction of the product that is crosslinked and is therefore not soluble in a particular solvent. Rationally, the gel content is determined in the same solvent as the swelling index. Customary gel contents of the graft bases b1 of the invention are in the 50 to 90% range, preferably 55 to 85%, and more preferably 60 to 80%. With the mixtures of graft bases b1', b1", and b1''' with trimodal particle size distribution, these being used preferably in accordance with the invention, the individual gel contents are all within the ranges described earlier on above.

The swelling index is determined, for example, by the following method: around 0.2 g of the solids of a graft base dispersion filmed by evaporation of water are swollen in a sufficient amount (e.g., 50 g) of toluene. After 24 hours, for example, the toluene is drawn off under suction and the sample is weighed. After the sample has been dried under reduced pressure it is weighed again. The swelling index is the ratio of the final mass after the swelling operation to the final dry mass after the further drying. Accordingly, the gel fraction is computed from the ratio of the dry mass after the swelling step to the initial mass before the swelling step (×100%).

The T2 time is determined by measuring the NMR relaxation of a dewatered, filmed sample of the graft base dispersion. For this purpose, for example, the sample is dried under reduced pressure for 3 hours at 60° C., for example, after having been flashed off overnight, and then is measured with a suitable measuring instrument, e.g., a minispec from Brucker, at 80° C. Samples are comparable only if they have been measured by the same method, since relaxation is significantly temperature-dependent.

The graft base b2 may be produced under the same conditions as for the production of graft base b1, and the graft b2 can be produced in one or more process steps.

In the case of a two-stage grafting, for example, first styrene or alpha-methylstyrene alone and thereafter styrene and acrylonitrile can be polymerized in two successive steps. This two-stage grafting (first styrene, then styrene/acrylonitrile) is one preferred embodiment. Further details on the preparation of the graft copolymers and of the impact modifiers b are described in DE 12 60 135 and DE 31 49 358.

It is advantageous for the graft polymerization onto the graft base b1 to be carried out in turn in aqueous emulsion. It can be performed in the same system as the polymerization of the graft base, in which case emulsifier and initiator may further be added. They need not be identical to the emulsifiers and initiators used for preparing the graft base b1. For example, it may be useful, as initiator for preparing the graft base b1, to use a persulfate, but to use a redox initiator system for the polymerization of the graft shell b2. Otherwise, the selection of emulsifier, initiator, and polymerization auxiliaries is governed by the statements made with regard to the preparation of graft base b1. The monomer mixture to be grafted on may be added to the reaction mixture all at once, in batches in two or more stages, or, preferably, continuously during the polymerization.

Where ungrafted polymers of the monomers b21) to b23) are formed during the grafting of the graft base b1, the amounts, which are in general below 10 wt % of b2, are assigned to the mass of component b.

According to a further preferred embodiment, the impact modifier b may be prepared by bulk polymerization as described for example in "Modern Styrenic Polymers: Polystyrenes and Styrenic Copolymers" (Eds., J. Scheirs, D. Priddy, Wiley, Chichester, UK, (2003), pages 29 and 305 ff.). Polymers b in this case are obtained that have particle sizes of generally 250 nm to 10 µm, preferably 300 nm to 5 µm, more preferably 400 nm to 3 µm, very preferably 800 nm to 3 µm.

According to one embodiment, particularly for 3D printing with high extrusion rate, preference is given to a thermoplastic molding composition of the invention, comprising a polymer mixture A composed of components a and b:

a: 75 to 95 wt %, preferably 80 to 90 wt % of at least one polymer a having an average molar mass Mw of 150 000 to 360 000 g/mol, selected from:
vinylaromatic copolymers selected from the group consisting of: styrene-acrylonitrile copolymers, α-methylstyrene-acrylonitrile copolymers, styrene-acrylonitrile-maleic anhydride copolymers, styrene-acrylonitrile-phenylmaleimide copolymers, α-methylstyrene-acrylonitrile-methyl methacrylate copolymers,
where the styrene-acrylonitrile copolymers and α-methylstyrene-acrylonitrile copolymers consist of 18 to 35 wt % acrylonitrile and 82 to 65 wt % styrene or α-methylstyrene, and the styrene-acrylonitrile-maleic anhydride copolymers, styrene-acrylonitrile-N-phenylmaleimide copolymers, and α-methylstyrene-acrylonitrile-methyl methacrylate copolymers consist of 18 to 35 wt % acrylonitrile, 67 to 64.9 wt % styrene, and 0.1 to 15 wt % maleic anhydride, N-phenylmaleimide or methyl methacrylate;

b: 5 to 25 wt %, preferably 10 to 20 of at least one impact modifier b, with b1: 20 to 90 wt % of a graft base of one or more monomers, consisting of:
b11: 70 to 100 wt % of at least one conjugated diene,
b12: 0 to 30 wt % of at least one further comonomer selected from: styrene, α-methylstyrene, acrylo-nitrile, methacrylonitrile, MMA, MAN, and N-phenylmaleimide (N-PMI);
b13: 0 to 10 wt % of one or more polyfunctional, crosslinking monomers,
b2: 10 to 80 wt % of a graft base of one or more monomers, consisting of:
b21: 65 to 95 wt %, preferably 70 to 90 wt %, more particularly 72.5 to 85 wt %, often more preferably 75 to 85 wt %, of at least one vinylaromatic monomer, preferably styrene and/or α-methylstyrene, more particularly styrene;
b22) 5 to 35 wt %, preferably 10 to 30 wt %, more particularly 15 to 27.5 wt %, often more preferably 15 to 25 wt % of acrylonitrile and/or methacrylonitrile, preferably acrylonitrile,
b23) 0 to 30 wt %, preferably 0 to 20 wt %, more preferably 0 to 15 wt % of at least one further mono-ethylenically unsaturated monomer selected from: MMA, MAN, and N-PMI;
where the sum of a and b makes 100 wt %,
characterized in that the viscosity (measured to ISO 11443) of the molding composition at shear rates of 1 to 10 l/s and at temperatures of 250° C. is not higher than $1 \times 10^5$ Pa*s and the melt volume rate (MVR, measured to ISO 1133 at 220° C. and 10 kg load) is more than 6 ml/10 min.

The amounts in % by weight of the comonomers present in the polymer a always add up to 100 wt %. The sum of the amounts in wt % of components b11, b12, and optionally b13, and also the sum of the amounts in wt % of components b21, b22, and optionally b23, always make 100 wt %.

With particular preference in accordance with the aforementioned embodiment, especially for 3D printing with high extrusion rate, is a thermoplastic molding composition of the invention, comprising a polymer mixture A composed of the components a and b:

a: 75 to 95 wt %, preferably 80 to 90 wt %, of at least one polymer a having an average molar mass Mw of 150 000 to 360 000 g/mol, selected from:
  styrene-acrylonitrile copolymers and α-methyl-styrene-acrylonitrile copolymers, preferably styrene-acrylonitrile copolymers, consisting of: 18 to 35 wt % acrylonitrile and 82 to 65 wt % styrene or α-methylstyrene;
b: 5 to 25 wt %, preferably 10 to 20 wt %, of at least one ABS impact modifier b, with
  b1: 40 to 90 wt % of a graft base of one or more monomers, consisting of:
  b11: 70 to 100 wt % of butadiene,
  b12: 0 to 30 wt % of styrene,
  b13: 0 to 10 wt % of one or more polyfunctional, crosslinking monomers,
  b2: 10 to 60 wt % of a graft consisting of:
  b21: 65 to 95 wt %, preferably 70 to 90 wt %, more particularly 72.5 to 85 wt %, often more preferably 75 to 85 wt % of styrene and
  b22) 5 to 35 wt %, preferably 10 to 30 wt %, more particularly 15 to 27.5 wt %, often more preferably 15 to 25 wt %, of acrylonitrile;
where the sum of a and b makes 100 wt %,
characterized in that the viscosity (measured to ISO 11443) of the molding composition at shear rates of 1 to 10 l/s and at temperatures of 250° C. is not higher than $1 \times 10^5$ Pa*s and the melt volume rate (MVR, measured to ISO 1133 at 220° C. and 10 kg load) is more than 6 ml/10 min.

Preferably the impact modifier b present in the polymer mixtures A according to the aforementioned embodiment, particularly for 3D printing with high extrusion rate, has a trimodal particle size distribution and is in particular a mixture of ABS graft copolymers b', b", and b''', with the graft base b1' of the ABS graft copolymer b' having an average particle diameter $d_{50}$ of 25 to 200 nm, preferably 30 to 180 nm, more preferably 60 to 170 nm, the graft base b1" of the ABS graft copolymer b" having an average particle diameter $d_{50}$ of 230 to 330 nm, preferably of 240 to 320 nm, and more preferably of 250 to 310 nm, and the graft base b1''' of the ABS graft copolymer b''' possessing an average particle diameter $d_{50}$ of 340 to 480 nm, preferably of 350 to 470 nm, and more preferably of 360 to 460 nm.

The graft bases b1', b1", and b1''' are preferably butadiene homopolymers and the respective graft b2 is preferably a SAN copolymer.

Preferred is a molding composition of the invention in accordance with the aforementioned embodiment for 3D printing with high extrusion rate, comprising (or consisting of):
  70 to 99.9 wt % of polymer mixture A,
  0 to 29.9 wt % of polymer B, and
  0.1 to 30 wt % of additives and/or auxiliaries C,
  based in each case on the overall molding composition, and where the sum of A, B and C is 100 wt %.

Particularly preferred is one of the aforementioned molding compositions of the invention for 3D printing with high extrusion rate, comprising (or consisting of):
  90 to 99.9 wt % of polymer mixture A,
  0.1 to 10 wt % of additives and/or auxiliaries C,
  based in each case on the overall molding composition, and where the sum of A, B and C is 100 wt %.

Further preferred are aforementioned molding compositions of the invention in accordance with the embodiment for 3D printing of high extrusion rate that comprise 0.1 to 2 wt %, preferably 0.1 to 1 wt %, of a lubricant, based on the overall molding composition. The lubricant may be an internal and/or external lubricant.

A further subject of the invention is a method for producing three-dimensional moldings with a 3D printer by fused deposition modeling, wherein filaments of the molding composition of the invention according to the embodiment with a high extrusion rate are melted in a 3D printer with a heating nozzle which has a diameter of 0.3 to 0.8 mm, preferably 0.35 to 0.45 mm, more preferably 0.4 mm, at a nozzle temperature of 200 to 270° C., preferably 230 to 250° C., very preferably 240° C., and the melted molding composition is extruded at a rate of 60 to 180 mm/s, preferably 80 to 160 mm/s, more preferably 100 to 140 mm/s.

Preferred according to another embodiment, especially for 3D printing in high print quality, is a thermoplastic molding composition of the invention comprising a polymer mixture A composed of components a and b:
  a: 65 to 95 wt %, preferably 70 to 90 wt %, more preferably 75 to 90 wt % of at least one polymer a having an average molar mass Mw of 150 000 to 360 000 g/mol, selected from:
    vinylaromatic copolymers selected from the group consisting of: styrene-acrylonitrile copolymers, α-methylstyrene-acrylonitrile copolymers, styrene-acrylonitrile-maleic anhydride copolymers, styrene-acrylonitrile-phenylmaleimide copolymers, α-methylstyrene-acrylonitrile-methyl methacrylate copolymers,
    where the styrene-acrylonitrile copolymers and α-methylstyrene-acrylonitrile copolymers consist of 18 to 35 wt % acrylonitrile and 82 to 65 wt % styrene or α-methylstyrene, and the styrene-acrylonitrile-maleic anhydride copolymers, styrene-acrylonitrile-N-phenylmaleimide copolymers, and α-methylstyrene-acrylonitrile-methyl methacrylate copolymers consist of 18 to 35 wt % acrylonitrile, 67 to 64.9 wt % styrene, and 0.1 to 15 wt % maleic anhydride, N-phenylmaleimide or methyl methacrylate;
  b: 5 to 35 wt %, preferably 10 to 30 wt %, more preferably 10 to 25 wt % of at least one impact modifier b, with
    b1: 20 to 90 wt % of a graft base of one or more monomers, consisting of:
    b11: 70 to 100 wt % of at least one conjugated diene,
    b12: 0 to 30 wt % of at least one further comonomer selected from: styrene, α-methylstyrene, acrylo-nitrile, methacrylonitrile, MMA, MAN, and N-phenylmaleimide (N-PMI);
    b13: 0 to 10 wt % of one or more polyfunctional, crosslinking monomers,
    b2: 10 to 80 wt % of a graft of one or more monomers, consisting of:
    b21: 65 to 95 wt %, preferably 70 to 90 wt %, more particularly 72.5 to 85 wt %, often more preferably 75 to 85 wt %, of at least one vinylaromatic monomer, preferably styrene and/or α-methylstyrene, more particularly styrene;
    b22) 5 to 35 wt %, preferably 10 to 30 wt %, more particularly 15 to 27.5 wt %, often more preferably 15 to 25 wt % of acrylonitrile and/or methacrylonitrile, preferably acrylonitrile,
    b23) 0 to 30 wt %, preferably 0 to 20 wt %, more preferably 0 to 15 wt % of at least one further monoethylenically unsaturated monomer selected from: MMA, MAN, and N-PMI;
  where the sum of a and b makes 100 wt %,
characterized in that the viscosity (measured to ISO 11443) of the molding composition at shear rates of 1 to 10 l/s and at temperatures of 250° C. is not higher than 1×10$^5$ Pa*s and the melt volume rate (MVR, measured to ISO 1133 at 220° C. and 10 kg load) is more than 6 ml/10 min.

The amounts in % by weight of the comonomers present in the polymer a always add up to 100 wt %. The sum of the amounts in wt % of components b11, b12, and optionally b13, and also the sum of the amounts in wt % of components b21, b22, and optionally b23, always make 100 wt %.

With particular preference in accordance with the aforementioned embodiment, especially for 3D printing in high print quality, is a thermoplastic molding composition of the invention, comprising a polymer mixture A composed of the components a and b:
- a: 65 to 95 wt %, preferably 70 to 90 wt %, more preferably 75 to 90 wt % of at least one polymer a having an average molar mass Mw of 150 000 to 360 000 g/mol, selected from:
  - styrene-acrylonitrile copolymers and α-methyl-styrene-acrylonitrile copolymers, preferably styrene-acrylonitrile copolymers, consisting of: 18 to 35 wt % acrylonitrile and 82 to 65 wt % styrene or α-methylstyrene;
- b: 5 to 35 wt %, preferably 10 to 30 wt %, more preferably 10 to 25 wt % of at least one ABS impact modifier b, with
- b1: 40-90 wt % of a graft base of one or more monomers, consisting of:
- b11: 70 to 100 wt % of butadiene,
- b12: 0 to 30 wt % of styrene,
- b13: 0 to 10 wt % of one or more polyfunctional, crosslinking monomers,
- b2: 10 to 60 wt % of a graft consisting of:
- b21: 65 to 95 wt %, preferably 70 to 90 wt %, more particularly 72.5 to 85 wt %, often more preferably 75 to 85 wt % of styrene and
- b22) 5 to 35 wt %, preferably 10 to 30 wt %, more particularly 15 to 27.5 wt %, often more preferably 15 to 25 wt %, of acrylonitrile;

where the sum of a and b makes 100 wt %, characterized in that the viscosity (measured to ISO 11443) of the molding composition at shear rates of 1 to 10 l/s and at temperatures of 250° C. is not higher than 1×10$^5$ Pa*s and the melt volume rate (MVR, measured to ISO 1133 at 220° C. and 10 kg load) is more than 6 ml/10 min.

Preferably the impact modifier b present in the polymer mixtures A according to the aforementioned embodiment, particularly for 3D printing in high print quality, has a trimodal particle size distribution and is in particular a mixture of ABS graft copolymers b', b", and b"', with the graft base b1' of the ABS graft copolymer b' having an average particle diameter d$_{50}$ of 25 to 200 nm, preferably 30 to 180 nm, more preferably 60 to 170 nm, the graft base b1" of the ABS graft copolymer b" having an average particle diameter d$_{50}$ of 230 to 330 nm, preferably of 240 to 320 nm, and more preferably of 250 to 310 nm, and the graft base b1"' of the ABS graft copolymer b"' possessing an average particle diameter d$_{50}$ of 340 to 480 nm, preferably of 350 to 470 nm, and more preferably of 360 to 460 nm.

The graft bases b1', b1", and b1"' are preferably butadiene homopolymers and the respective graft b2 is preferably a SAN copolymer.

Preferred is a molding composition of the invention in accordance with the aforementioned embodiment for 3D printing in high print quality, comprising (or consisting of):
- 70 to 99.9 wt % of polymer mixture A,
- 0 to 29.9 wt % of polymer B, and
- 0.1 to 30 wt % of additives and/or auxiliaries C, based in each case on the overall molding composition, and where the sum of A, B and C is 100 wt %.

Particularly preferred is one of the aforementioned molding compositions of the invention, particularly for 3D printing in high print quality, comprising (or consisting of):
- 90 to 99.9 wt % of polymer mixture A,
- 0.1 to 10 wt % of additives and/or auxiliaries C, based in each case on the overall molding composition, and where the sum of A, B and C is 100 wt %.

A further subject of the invention is a method for determining the print quality, more particularly the warpage, the dimensional stability, the layer adhesion, and the contact area between the layers, of a 3-dimensional molding of the molding composition of the invention, produced by 3D printing by fused deposition modeling, where the ratio of the width of the extruded strand to minimum edge length or of the width of the extruded strand to minimum diameter of the 3-dimensional molding is at least 1:20, preferably at least 1:50, more preferably at least 1:100, very preferably 1:250.

Customary widths of the extruded strand are 0.20 to 1.00 mm, more particularly 0.40 to 0.90 mm, very preferably 0.60 to 0.70 mm.

At a strand width of 0.40 to 0.90 mm, more particularly 0.60 to 0.70 mm, the ratio of the width of the extruded strand to minimum edge length or of the width of the extruded strand to minimum diameter of the 3-dimensional molding is at least 1:20, preferably at least 1:50, more preferably at least 1:100.

Preferred according to another embodiment, more particularly for producing filaments with high dimensional stability for 3D printing, is a thermoplastic molding composition of the invention comprising a polymer mixture A composed of components a and b:
- a: 30 to 60 wt %, preferably 40 to 60 wt %, more preferably 50 to 60 wt % of at least one polymer a having an average molar mass Mw of 150 000 to 360 000 g/mol, selected from:
  - vinylaromatic copolymers selected from the group consisting of: styrene-acrylonitrile copolymers, α-methylstyrene-acrylonitrile copolymers, styrene-acrylonitrile-maleic anhydride copolymers, styrene-acrylonitrile-phenylmaleimide copolymers, α-methylstyrene-acrylonitrile-methyl methacrylate copolymers,
  - where the styrene-acrylonitrile copolymers and α-methylstyrene-acrylonitrile copolymers consist of 18 to 35 wt % acrylonitrile and 82 to 65 wt % styrene or α-methylstyrene, and the styrene-acrylonitrile-maleic anhydride copolymers, styrene-acrylonitrile-N-phenylmaleimide copolymers, and α-methylstyrene-acrylonitrile-methyl methacrylate copolymers consist of 18 to 35 wt % acrylonitrile, 67 to 64.9 wt % styrene, and 0.1 to 15 wt % maleic anhydride, N-phenylmaleimide or methyl methacrylate;
- b: 40 to 70 wt %, preferably 40 to 60 wt %, more preferably 40 to 50 wt % of at least one impact modifier b, with
- b1: 20 to 90 wt % of a graft base of one or more monomers, consisting of:
- b11: 70 to 100 wt % of at least one conjugated diene,
- b12: 0 to 30 wt % of at least one further comonomer selected from: styrene, α-methylstyrene, acrylo-nitrile, methacrylonitrile, MMA, MAN, and N-phenylmaleimide (N-PMI);
- b13: 0 to 10 wt % of one or more polyfunctional, crosslinking monomers, b2: 10 to 80 wt % of a graft of one or more monomers, consisting of:
b21: 65 to 95 wt %, preferably 70 to 90 wt %, more particularly 72.5 to 85 wt %, often more preferably 75 to 85 wt %, of at least one vinylaromatic monomer, preferably styrene and/or α-methylstyrene, more particularly styrene;
b22) 5 to 35 wt %, preferably 10 to 30 wt %, more particularly 15 to 27.5 wt %, often more preferably 15 to 25 wt % of acrylonitrile and/or methacrylonitrile, preferably acrylonitrile,
b23) 0 to 30 wt %, preferably 0 to 20 wt %, more preferably 0 to 15 wt % of at least one further monoethylenically unsaturated monomer selected from: MMA, MAN, and N-PMI;
where the sum of a and b makes 100 wt %,
characterized in that the viscosity (measured to ISO 11443) of the molding composition at shear rates of 1 to 10 l/s and at temperatures of 250° C. is not higher than $1 \times 10^5$ Pa*s and the melt volume rate (MVR, measured to ISO 1133 at 220° C. and 10 kg load) is more than 6 ml/10 min.

The amounts in % by weight of the comonomers present in the polymer a always add up to 100 wt %. The sum of the amounts in wt % of components b11, b12, and optionally b13, and also the sum of the amounts in wt % of components b21, b22, and optionally b23, always make 100 wt %.

With particular preference in accordance with the aforementioned embodiment, especially for producing filaments with high dimensional stability for 3D printing, is a thermoplastic molding composition of the invention comprising a polymer mixture A composed of the components a and b:
a: 30 to 60 wt %, preferably 40 to 60 wt %, more preferably 50 to 60 wt % of at least one polymer a having an average molar mass Mw of 150 000 to 360 000 g/mol, selected from:
styrene-acrylonitrile copolymers and α-methyl-styrene-acrylonitrile copolymers, preferably styrene-acrylonitrile copolymers, consisting of:
18 to 35 wt % acrylonitrile and 82 to 65 wt % styrene or α-methylstyrene;
b: 40 to 70 wt %, preferably 40 to 60 wt %, more preferably 40 to 50 wt % of at least one ABS impact modifier b, with
b1: 40 to 90 wt % of a graft base of one or more monomers, consisting of:
b11: 70 to 100 wt % of butadiene,
b12: 0 to 30 wt % of styrene,
b13: 0 to 10 wt % of one or more polyfunctional, crosslinking monomers,
b2: 10 to 60 wt % of a graft consisting of:
b21: 65 to 95 wt %, preferably 70 to 90 wt %, more particularly 72.5 to 85 wt %, often more preferably 75 to 85 wt % of styrene and
b22) 5 to 35 wt %, preferably 10 to 30 wt %, more particularly 15 to 27.5 wt %, often more preferably 15 to 25 wt %, of acrylonitrile;
where the sum of a and b makes 100 wt %,
characterized in that the viscosity (measured to ISO 11443) of the molding composition at shear rates of 1 to 10 l/s and at temperatures of 250° C. is not higher than $1 \times 10^5$ Pa*s and the melt volume rate (MVR, measured to ISO 1133 at 220° C. and 10 kg load) is more than 6 ml/10 min.

Preferably the impact modifier b present in the polymer mixtures A according to the aforementioned embodiment, particularly for producing filaments with high dimensional stability for 3D printing, has a trimodal particle size distribution and is in particular a mixture of ABS graft copolymers b', b'', and b''', with the graft base b1' of the ABS graft copolymer b' having an average particle diameter $d_{50}$ of 25 to 200 nm, preferably 30 to 180 nm, more preferably 60 to 170 nm, the graft base b1'' of the ABS graft copolymer b'' having an average particle diameter $d_{50}$ of 230 to 330 nm, preferably of 240 to 320 nm, and more preferably of 250 to 310 nm, and the graft base b1''' of the ABS graft copolymer b''' possessing an average particle diameter $d_{50}$ of 340 to 480 nm, preferably of 350 to 470 nm, and more preferably of 360 to 460 nm.

The graft bases b1', b1'', and b1''' are preferably butadiene homopolymers and the respective graft b2 is preferably a SAN copolymer.

Preferred is a molding composition of the invention in accordance with the aforementioned embodiment especially for producing filaments with high dimensional stability for 3D printing, comprising (or consisting of):
70 to 99.9 wt % of polymer mixture A,
0 to 29.9 wt % of polymer B, and
0.1 to 30 wt % of additives and/or auxiliaries C,
based in each case on the overall molding composition, and where the sum of A, B and C is 100 wt %.

Particularly preferred is one of the aforementioned molding compositions of the invention for producing filaments with high dimensional stability for 3D printing, comprising (or consisting of):
90 to 99.9 wt % of polymer mixture A,
0.1 to 10 wt % of additives and/or auxiliaries C,
based in each case on the overall molding composition, and where the sum of A, B and C is 100 wt %.

A further subject of the invention is the use of the molding composition of the invention according to the aforementioned embodiment for producing filaments for 3D printing.

Polymer B

The molding composition of the invention may further comprise at least one further polymer B selected from polycarbonates, polyamides, poly(meth)acrylates, and polyesters, and vinylaromatic-diene copolymers (SBC). Preferred as polymer B are polycarbonates, polyamides and/or poly(meth)acrylates.

Suitable polycarbonates are known per se. They are obtainable, for example, in accordance with the processes of DE-B-1 300 266, by interfacial polycondensation, or the process of DE-A 14 95 730, by reaction of biphenyl carbonate with bisphenols. A preferred bisphenol is 2,2-di(4-hydroxyphenyl)propane, referred to generally—and also below—as bisphenol A.

In place of bisphenol A it is also possible to use other aromatic dihydroxy compounds, especially 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxy-diphenylmethane, 1,1-di(4-hydroxyphenyl)ethane or 4,4-dihydroxybiphenyl, and also mixtures of the aforesaid dihydroxy compounds.

Particularly preferred polycarbonates are those based on bisphenol A or bisphenol A together with up to 30 mol % of the aforementioned aromatic dihydroxy compounds.

The relative viscosity of these polycarbonates is generally in the range from 1.1 to 1.5, more particularly 1.28 to 1.4 (noted at 25° C. in a 0.5 wt % strength solution in dichloromethane).

Suitable polyesters are likewise known per se and described in the literature. They include an aromatic ring in the main chain that originates from an aromatic dicarboxylic acid. The aromatic ring may also be substituted, as for example by halogen such as chloro and bromo or by C1-C4 alkyl groups such as methyl, ethyl, isopropyl and n-propyl, and n-butyl, isobutyl, and tert-butyl groups.

The polyesters may also be prepared in a way that is known per se through reaction of aromatic dicarboxylic acids, their esters or other ester-forming derivatives thereof with aliphatic dihydroxy compounds.

Preferred dicarboxylic acids are naphthalenedi-carboxylic acid, terephthalic acid, and isophthalic acid, or mixtures thereof. Up to 10 mol % of the aromatic dicarboxylic acids may be replaced by aliphatic or cycloaliphatic dicarboxylic acids such as adipic acid, azelaic acid, sebacic acid, dodecanedioic acids, and cyclohexanedicarboxylic acids.

Preferred among the aliphatic dihydroxy compounds are diols having 2 to 6 carbon atoms, especially 1,2-ethanediol, 1,4-butanediol, 1,6-hexanediol, 1,4-hexanediol, 1,4-cyclohexanediol, and neopentyl glycol, or mixtures thereof.

Particularly preferred polyesters are polyalkylene terephthalates which derive from alkanediols having 2 to 6 C atoms. Preferred especially among these are polyethylene terephthalate, polyethylene naphthalate, and polybutylene terephthalate.

The viscosity number of the polyesters is situated in general in the range from 60 to 200 ml/g (measured in a 0.5 wt % strength solution in a phenol/o-dichlorobenzene mixture (weight ratio 1:1 at 25° C.)).

Mentioned in particular as poly(meth)acrylates may be polymethyl methacrylate (PMMA) and also copolymers based on methyl methacrylate with up to 40 wt % of further copolymerizable monomers, of the kind available, for example, under the designations Lucryl® from Lucite or Plexiglas® from Evonik.

Partially crystalline, preferably linear polyamides such as polyamide 6, polyamide 6,6, polyamide 4,6, polyamide 6,12, and partially crystalline copolyamides based on these components are suitable. It is further possible to use partially crystalline polyamides whose acid component consists wholly or partly of adipic acid and/or terephthalic acid and/or isophthalic acid and/or suberic acid and/or sebacic acid and/or azelaic acid and/or dodecanedicarboxylic acid and/or a cyclohexane-dicarboxylic acid, and whose diamine component consists wholly or partly in particular of m- and/or p-xylylene-diamine and/or hexamethylenediamine and/or 2,2,4- and/or 2,4,4-trimethylhexamethylenediamine and/or isophoronediamine, and whose compositions are known in principle (cf. Encyclopedia of Polymers, vol. 11, p. 315 ff.).

The molecular weight Mn (number average) of the polyamides suitable as component B are preferably in the range between 5000 and 100 000, more preferably between 10 000 and 80 000.

Suitability is possessed by partially crystalline linear polyamides, for example, having a relative viscosity of 2.2 to 4.5, measured in 0.5% strength solution (0.5 g/l00 ml) in 96 wt % strength sulfuric acid at 25oC. Preferred polyamides are those deriving wholly or partly from lactams having 7 to 13 ring members, such as polycaprolactam, polycaprylyllactam or polyurolactam.

Further suitable are polyamides obtained by reacting dicarboxylic acids with one or more diamines. Examples of suitable dicarboxylic acids are alkanedicarboxylic acids having 6 to 12, especially 6 to 10, carbon atoms, especially adipic acid. Examples of suitable diamines are alkane- or cycloalkanediamines having 4 to 12, especially 4 to 8, carbon atoms; hexamethylenediamine, m-xylylenediamine, bis(4-aminophenyl)methane, bis(4-aminocyclohexyl)methane or 2,2-bis(4-amino-phenyl)propane, or mixtures thereof, are particularly suitable partners for preparing such polyamides. It may be advantageous to prepare the stated polyamides per se and to use mixtures thereof.

Of particular technical significance are polyamide 6 (polycaprolactam), polyamide 6,6 (polyhexamethylene-adipamide), and polyamides composed of at least 80 wt % of repeating units of the formula —[—NH—(CH2)4-NH—CO—(CH2)4-CO—)—. The last-mentioned polyamides are obtainable by condensing 1,4-diaminobutane with adipic acid. Suitable preparation processes for polyamides are described for example in EP-A 38 094, EP-A 38 582, and EP-A 39 524.

Likewise suitable are polyamides with a small fraction, preferably up to about 10 wt %, of other cocondensable constituents, especially other amide formers such as, for example, a,w-amino acids or N-carboxylic anhydrides (Leuchs anhydrides) of amino acids.

The molding compositions of the invention may further comprise as component B a partially aromatic copolyamide with the construction described below.

Preferred partially aromatic copolyamides B contain 40 to 90 wt % of units deriving from terephthalic acid and hexamethylenediamine. A small fraction of the terephthalic acid, preferably not more than 10 wt % of the total amount of aromatic dicarboxylic acids used, may be replaced by isophthalic acid or other aromatic dicarboxylic acids, preferably those in which the carboxyl groups are in para position.

Besides the units deriving from terephthalic acid and hexamethylenediamine, the partially aromatic copolyamides contain units which derive from ϵ-caprolactam and/or units which derive from adipic acid and hexamethylenediamine. The fraction of units deriving from ϵ-caprolactam is up to 50 wt %, preferably 20 to 50 wt %, especially 25 to 40 wt %, while the fraction of units deriving from adipic acid and hexamethylene-diamine is up to 60 wt %, preferably 30 to 60 wt %, and especially 35 to 55 wt %.

The copolyamides may also contain both units of ϵ-caprolactam and units of adipic acid and hexamethylenediamine; in this case, the fraction of units which are free from aromatic groups is preferably at least 10 wt %, more preferably at least 20 wt %. The ratio of the units deriving from e-caprolactam and from adipic acid and hexamethylenediamine is not subject to any particular restriction here.

The melting point of particularly suitable partially aromatic copolyamides is situated for example in the range from 260 to more than 300° C., this high melting point also being associated with a high glass transition temperature of generally more than 75° C., especially more than 85° C. Binary copolyamides based on terephthalic acid, hexamethylenediamine, and ϵ-caprolactam, for a content of about 70 wt % of units deriving from terephthalic acid and hexamethylenediamine, have a melting point in the range of 300° C. and a glass transition temperature of more than 110° C. Binary copolyamides based on terephthalic acid, adipic acid, and hexamethylenediamine reach a melting point of 300° C. or more at a level of just about 55 wt % of units of terephthalic acid and hexamethylenediamine, with the glass transition temperature being not quite as high as for binary copolyamides which comprise ϵ-caprolactam in place of adipic acid or adipic acid/hexamethylene-diamine.

Suitable partially aromatic copolyamides can be prepared by the processes described in EP-A 129 195 and EP-A 129 196.

In accordance with the invention, furthermore, amorphous polyamides can be used as polymer B. Based on the monomers already stated, additional monomers, frequently provided with one or more crystallization-hindering side groups, are cocondensed. As a result, the polyamide obtained is generally transparent.

In accordance with the invention it is possible as polymer B, furthermore, to use vinylaromatic-diene block copolymers (SBC), especially styrene-butadiene block copolymers. Preferred block copolymers are those comprising at least two hard blocks S1 and S2 of vinylaromatic monomers with at least one soft block of dienes and optionally vinylaromatic monomers between them, the fraction of the hard blocks being above 40 wt %, based on the overall block copolymer. Vinyl-aromatics which can be used, both for the hard blocks S1 and S2 and for the soft blocks, are styrene, a-methylstyrene, p-methylstyrene, ethylstyrene, tert-butylstyrene, vinyltoluene or mixtures thereof. Styrene is preferably used.

Dienes used for the soft block B and/or B/S are preferably butadiene, isoprene, 2,3-dimethylbutadiene, 1,3-pentadiene, 1,3-hexadienes or piperylene, or mixtures thereof. Particular preference is given to using 1,3-butadiene.

The soft block is identified as B or, if formed from dienes and vinylaromatic monomers, as B/S.

Preferred block copolymers contain external hard blocks S1 and S2 with different block lengths. The molecular weight of S1 is preferably in the range from 5000 to 30 000 g/mol, more particularly in the range from 10 000 to 20 000 g/mol. The molecular weight of S2 is preferably above 35 000 g/mol. Preferred molecular weights of S2 are in the range from 50 000 to 150 000 g/mol.

Between the hard blocks S1 and S2 there may also be two or more soft blocks. Preference is given to at least 2, preferably random, soft blocks $(B/S)_1$ and $(B/S)_2$ with different fractions of vinylaromatic monomers and hence different glass transition temperatures.

The block copolymers may have a linear or a star-shaped structure.

As a linear block copolymer, preference is given to using one with the structure $S1-(B/S)_1-(B/S)_2-S2$. The molar ratio of vinylaromatic monomer to diene S/B in the block $(B/S)_1$ is preferably below 0.25 and in the block $(B/S)_2$ it is preferably in the range from 0.5 to 2.

Preferred star-shaped block copolymers are those with a structure comprising at least one star arm composed of the block sequence S1-(B/S) and one star arm with the block sequence S2(B/S), or those with at least one star arm of the block sequence S1-(B/S)-S3 and at least one star arm of the block sequence S2-(B/S)-S3. S3 here is a further hard block of the stated vinylaromatic monomers.

Particularly preferred are star-shaped block copolymers with structures which have at least one star arm with the block sequence $S1-(B/S)_1-(B/S)_2$ and at least one star arm with the block sequence $S2-(B/S)_1-(B/S)_2$, or which have at least one star arm with the block sequence $S1-(B/S)_1-(B/S)_2-S3$ and at least one star arm with the block sequence $S2-(B/S)_1-(B/S)_2-S3$. The molar ratio of vinylaromatic monomer to diene S/B in the outer block $(B/S)_1$ is preferably in the range from 0.5 to 2 and in the block $(B/S)_2$ it is preferably below 0.5.

The block copolymers B are prepared preferably by sequential anionic polymerization. The aforementioned SBCs are known. Their preparation is described for example in "Modern Styrenic Polymers: Polystyrenes and Styrenic Copolymers" (Eds., J. Scheirs, D. Priddy, Wiley, Chichester, UK, (2003), pages 502 to 507).

Furthermore, suitable vinylaromatic-diene block copolymers (SBC) are also, for example, available commercially as Styrolux® (manufacturer: Styrolution, Frankfurt).

Additives and/or Auxiliaries C

The molding composition of the invention may optionally comprise customary additives and/or auxiliaries C such as stabilizers, oxidation retarders, agents to counter thermal decomposition and decomposition due to ultraviolet light, lubricants and mold release agents, colorants such as dyes and pigments, fibrous and pulverulent fillers and reinforcing agents, nucleating agents, plasticizers, etc., the fraction thereof being in general not more than 50 wt %, preferably not more than 40 wt %.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof, in concentrations of up to 1 wt %, based on the weight of the thermoplastic molding composition.

UV stabilizers, used generally in amounts of up to 2 wt %, based on the molding composition, include various substituted resorcinols, salicylates, benzotriazoles, and benzophenones.

Furthermore, organic dyes may be added, such as nigrosine, pigments such as titanium dioxide, phthalocyanines, ultramarine blue, and carbon black as colorants, and also fibrous and pulverulent fillers and reinforcing agents. Examples of the latter are carbon fibers, glass fibers, amorphous silica, calcium silicate (wollastonite), aluminum silicate, magnesium carbonate, kaolin, chalk, powdered quartz, mica, and feldspar. The fraction of such fillers and colorants is generally up to 50 wt %, preferably up to 35 wt %.

Examples of nucleating agents that can be used are talc, calcium chloride, sodium phenylphosphinate, aluminum oxide, silicon dioxide, and nylon 22.

Examples of lubricants and mold release agents, which can be used in general in amounts up to 1 wt %, are long-chain fatty acids such as stearic acid or behenic acid, their salts (e.g., Ca or Zn stearate) or esters (e.g., stearyl stearate or pentaerythrityl tetra-stearate), and also amide derivatives (e.g., ethylene-bisstearylamide). For better processing, mineral-based antiblocking agents may be added in amounts up to 0.1 wt % to the molding compositions of the invention. Examples include amorphous or crystalline silica, calcium carbonate, or aluminum silicate.

Processing assistants which can be used are, for example, mineral oil, preferably medical white oil, in amounts up to 5 wt %, preferably up to 2 wt %.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide.

For further improving the resistance to inflammation, it is possible to add all of the flame retardants known for the thermoplastics in question, more particularly those flame retardants based on phosphorus compounds and/or on red phosphorus itself.

The molding compositions of the invention may be produced from components a and b (and optionally further polymers B and additives and/or auxiliaries C) by all known methods.

According to one preferred embodiment, the molding composition of the invention comprises (or consists of):

40 to 100 wt % of polymer mixture A,
0 to 60 wt % of polymer B, and
0 to 40 wt % of additives and/or auxiliaries C,
based in each case on the overall molding composition,
and where the sum of A, B and C is 100 wt %.

Further preferred is a molding composition of the invention comprising (or consisting of):
70 to 99.9 wt % of polymer mixture A,
0 to 29.9 wt % of polymer B, and
0.1 to 30 wt % of additives and/or auxiliaries C,
based in each case on the overall molding composition, and where the sum of A, B and C is 100 wt %.

Further very preferred is a molding composition of the invention comprising (or consisting of):
90 to 99.9 wt % of polymer mixture A,
0 to 29.9 wt % of polymer B, and
0.1 to 10 wt % of additives and/or auxiliaries C,
based in each case on the overall molding composition, and where the sum of A, B and C is 100 wt %.

As regards the production of the thermoplastic molding compositions, details follow hereinafter:

The graft polymers and/or impact modifiers b with bimodal particle size distribution are prepared by the method of emulsion polymerization, as already described above. As already described, the bimodal particle size distribution is established by appropriate measures. The aforementioned (partial) agglomeration of the polymer particles, by addition of an agglomerating dispersion of an acrylic ester polymer, is preferred. Instead or in combination with the (partial) agglomeration it is possible to take other suitable measures, familiar to the skilled person, in order to bring about the bimodal particle size distribution.

Further preferred is the separate preparation and subsequent mixing of two or, even more preferably, three different graft copolymers b' and b" or b', b", and b"', which differ in their average particle diameter. The resulting dispersion of the graft polymers and/or impact modifiers b may either be mixed directly with components a) and optionally B) and/or C), or it may be worked up beforehand. The latter approach is preferred.

The dispersion of the graft polymers and/or impact modifiers b is worked up in a manner known per se. Customarily, first of all, the graft polymer b is precipitated in the dispersion, by addition of precipitating salt solutions (such as calcium chloride, magnesium sulfate, alum) or acids (such as acetic acid, hydrochloric acid or sulfuric acid), for example, or else by freezing (freeze coagulation). The aqueous phase can be removed in a customary way, for instance by sieving, filtering, decanting or centrifuging. This prior separation of the dispersion water produces water-moist graft polymers and/or impact modifiers b having a residual water content of up to 60 wt %, based on b, in which case the residual water, for example, may adhere externally to the graft polymer b and may also be included within it.

The graft polymer b can subsequently, as and when required, be dried further in a known way, for example, using hot air or by means of a pneumatic dryer. It is also possible to work up the dispersion by spray drying.

The graft polymers b are mixed with the polymer a and, where present, with the further components B and/or C in a mixing apparatus, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components a and b, and—where included—B and/or C may be mixed, for example, by joint extrusion, kneading, or rolling, the aforementioned components necessarily having been isolated from the aqueous dispersion or from the aqueous solution obtained in the polymerization.

Where one or more components in the form of an aqueous dispersion or of an aqueous or nonaqueous solution are mixed in, the water and/or the solvent is removed from the mixing apparatus, preferably an extruder, via a degassing unit.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated. The temperature is guided by the chemical and physical properties of components a and b and—when present—B and/or C, and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 160 to 400, preferably 180 to 300° C.

In one preferred embodiment the mixing of the graft polymer b with the polymer a and, where included, with the further components B and/or C takes place in an extruder, with the dispersion of the graft polymer b being metered directly into the extruder, without prior removal of the dispersion water. The water is customarily removed along the extruder via suitable degassing facilities. Degassing facilities used may be, for example, degassing vents which are provided with retention screws (preventing the emergence of the polymer mixture).

In another, likewise preferred embodiment, the mixing of the aforementioned components takes place in an extruder, with the graft polymer b being separated beforehand from the dispersion water. As a result of this prior removal of the dispersion water, water-moist graft polymers b are obtained which have a residual water content of up to 60 wt %, based on b. The residual water present may then be removed in vapor form as described above via degassing facilities in the extruder. With particular preference, however, the residual water in the extruder is not removed solely as steam; instead, a part of the residual water is removed mechanically in the extruder and leaves the extruder in the liquid phase. In the case of this so-called squeeze method (EP-B 0 993 476, pp. 13-16), the same extruder is supplied with the polymer a and—where present—components B and/or C, meaning that the product of the method extruded is the completed molding composition.

Another feature of the molding composition used in accordance with the invention is that its residual monomer content is not more than 2000 ppm, preferably not more than 1000 ppm, more preferably not more than 500 ppm.

Residual monomer content refers to the fraction of unreacted (uncopolymerized) monomers in the molding composition.

Furthermore, the molding composition used in accordance with the invention features a solvent content, such as the content of ethylbenzene, toluene, etc., for example, of not more than 1000 ppm, preferably not more than 500 ppm, more preferably not more than 200 ppm.

The low residual monomer content and solvent content can be obtained by employing customary methods for reducing residual monomers and solvents from polymer melts, as described for example in Kunststoffhandbuch, Eds. R. Vieweg and G. Daumiller, vol. 4 "Polystyrol", Carl-Hanser-Verlag Munich (1996), pp. 121 to 139. In these methods, typical devolatizing apparatuses, such as, for example, partial vaporizers, flat evaporators, strand devolatilizers, thin-film evaporators or devolatilizing extruders, for example, are used. As a result of the low residual monomer content and also solvent content, the molding composition used in accordance with the invention is low in odor and is therefore outstandingly suitable for 3D printers in the home-use segment, and also for 3D printers employed industrially.

Furthermore, the molding composition contains not more than 500 ppm, preferably not more than 400 ppm, more preferably not more than 300 ppm of transition metals such as Fe, Mn, and Zn, for example. Molding compositions with a low level of transition metals of this kind can be obtained, for example, by using redox initiators—if used to initiate the polymerization of the polymers present in the molding composition—only in small amounts in combination with peroxides. Furthermore, therefore, there ought to be only small amounts of transition metal-containing minerals (e.g., pigments) present in the molding composition.

In order to prevent severe contraction, the coefficient of linear thermal expansion, CLTE, of the molding composition of the invention is preferably below $100\times10^{-6}$ 1/K, more preferably below $85\times10^{-6}$ 1/K. A CLTE of this kind can be set by limiting the fraction of the impact modifier b to 5 to not more than 30 wt % and/or through the addition of additives, more particularly minerals, preferably finely divided minerals having an average particle size of <500 μm, preferably <100 μm, in amounts of up to 40 wt %, based in each case on the overall molding composition.

Examples of suitable minerals (mineral additives) are carbon fibers, glass fibers, amorphous silica, calcium silicate (wollastonite), aluminum silicate, magnesium carbonate, kaolin, chalk, powdered quartz, mica, and feldspar.

According to one particular embodiment, the molding composition of the invention comprises:
- 40 to 100 wt % of polymer mixture A,
- 0 to 60 wt % of polymer B, and
- 0 to 40 wt % of minerals C,
- based in each case on the overall molding composition, and where the sum of A, B and C is 100 wt %.

Particularly preferred is a molding composition of the invention comprising:
- 70 to 100 wt % of polymer mixture A,
- 0 to 30 wt % of polymer B, and
- 0.1 to 30 wt % of minerals C.

Further particularly preferred is a molding composition of the invention comprising:
- 70 to 99.9 wt % of polymer mixture A,
- 0 to 29.9 wt % of polymer B, and
- 0.1 to 30 wt % of minerals C.

If the fraction of the minerals C in the aforementioned preferred molding compositions is less than 10 wt %, then the fraction of the polymer a is preferably 70 to 95 wt % and the fraction of the impact modifier b is preferably 5 to 30 wt % in the polymer mixture A.

The viscosity of the overall molding composition at shear rates of 1 to 10 1/s and at temperatures of 250° C. is not higher than $1\times10^5$ Pa*s, preferably not higher than $1\times10^4$ Pa*s, more preferably not higher than $1\times10^3$ Pa*s.

The melt volume rate (MVR, measured to ISO 1133 at 220° C. and 10 kg load) is generally more than 6 ml/10 min, preferably more than 8 ml/10 min, more preferably more than 12 ml/10 min.

The aforementioned molding compositions are used in accordance with the invention for producing three-dimensional objects of predetermined shape by means of a device for 3D printing. A further subject of the invention is therefore the use of the molding compositions of the invention for 3D printing.

It is possible here to use customary apparatuses suitable for 3D printing, especially 3D printers for home use. Likewise suitable are 3D printers for the industrial sphere.

The three-dimensional object is generally built up under computer control from the fluidized molding composition of the invention, according to mandated dimensions and shapes (CAD).

The three-dimensional object can be produced using customary methods of 3D printing in accordance with the prior art as described for example in EP 1015215 B1 and in US 2009/0295032 A1.

Customarily, first of all, the molding composition of the invention is fluidized and extruded, a plurality of layers of the molding composition are applied to a base such as a support or to a preceding layer of the molding composition, and then the shaped material is consolidated by cooling below the solidification temperature of the molding composition.

Preference is given to the use of the molding composition in 3D printers which are suitable for the fused deposition modeling (FDM) method.

A further subject of the invention is a method for producing 3-dimensional moldings from the molding composition of the invention, where in a 3D printer with a heating nozzle freely movable in the fabrication plane, a supplied filament of the molding composition is fluidized, and the fluidized molding composition is extruded, applied layer by layer, by means of a fused deposition modeling method, and consolidated, optionally by cooling. The nozzle temperature is generally 200 to 270° C., preferably 230 to 250° C., especially 240° C.

The molding compositions of the invention exhibit an optimized toughness/viscosity balance and are therefore outstandingly suitable for 3D printing.

A further advantage for the home-use sector and also for the industrial application sector is that the molding composition is of low odor, having only a low residual monomer content and also solvent content.

EXAMPLES

Employed as polymer a were the following copolymers:
- a1: SAN copolymer with 73 wt % styrene and 27 wt % acrylonitrile (=S/AN 73/27), MVR (220° C./10'): 55 ccm/10 min
- a2: SAN copolymer (S/AN 81/19, MVR (220° C./10'): 46 ccm/10 min
- a3: SAN copolymer (S/AN 75/25, MVR (220° C./10'): 10 ccm/10 min a4: SAN copolymer (S/AN 65/35, MVR (220° C./10'): 16 ccm/10 min a5: SAN copolymer (S/AN 65/35, MVR (220° C./10'): 61 ccm/10 min a6: AMSAN copolymer (AMS/AN 70/30, MVR (220° C./10'): 8 ccm/10 min a7: Mixture of SAN copolymer a1 and AMSAN copolymer a6 (SAN/AMSAN proportions as per tables 1 to 3)

The MVR was determined according to ISO 1133 at 220° C. with 10 kg load.

Employed as impact modifier b with a trimodal particle size distribution was a mixture of ABS graft copolymers b', b", and b'" with different particle diameters, the fraction of the ABS graft copolymers b" and b'" (weight ratio b":b'"=50:50) in the mixture together being 60 wt %, and the fraction of ABS graft copolymer b' being 40 wt %.

Preparation of ABS Graft Copolymers b" and b'"

29 parts by weight (reckoned as solid) of an anionically emulsified polybutadiene latex (b1") which is prepared using a polybutadiene seed latex having an average particle diameter $d_{50}$ of 111 nm via radical seed polymerization and which has an average particle diameter $d_{50}$ of 305 nm and a gel content of 55 wt % and 29 parts by weight (reckoned as solid) of an anionically emulsified polybutadiene latex (b1'") which is prepared using a polybutadiene seed latex having an average particle diameter $d_{50}$ of 137 nm via radical seed polymerization and which has an average particle diameter $d_{50}$ of 404 nm and a gel content of 81 wt % are brought with water to a solids content of approximately 20 wt %, then heated to 59° C. and admixed with 0.5 part by weight of potassium peroxodisulfate (in solution in water).

Thereafter 42 parts by weight of a mixture of 73 wt % styrene, 27 wt % acrylonitrile, and 0.12 part by weight of tert-dodecyl mercaptan are metered in at a uniform rate over the course of 6 hours; in parallel with this, 1 part by weight (reckoned as solid material) of the sodium salt of a resin acid mixture (Dresinate 731, Abieta Chemie GmbH, Gersthofen, Germany, in solution in alkalified water) is metered in over a period of 6 hours. Over the course of the 6 hours, the reaction temperature is raised from 59° C. to 80° C. After a two-hour afterreaction time of 80° C., the graft latex (b" and b'"), following addition of about 1.0 part by weight of a phenolic antioxidant, is coagulated using a magnesium sulfate/acetic acid mixture, and, after washing with water, the resulting wet powder is dried at 70° C.

Preparation of ABS Graft Copolymer b'

50 parts by weight (reckoned as solid) of an anionically emulsified polybutadiene latex which is prepared using a polybutadiene seed latex having an average particle diameter $d_{50}$ of 48 nm via radical seed polymerization and which has an average particle diameter $d_{50}$ of 137 nm and a gel content of 88 wt % are brought with water to a solids content of approximately 20 wt %, then heated to 59° C. and admixed with 0.5 part by weight of potassium peroxodisulfate (in solution in water).

Thereafter 50 parts by weight of a mixture of 73 wt % styrene, 27 wt % acrylonitrile, and 0.15 part by weight of tert-dodecyl mercaptan are metered in at a uniform rate over the course of 6 hours; in parallel with this, 1 part by weight (reckoned as solid material) of the sodium salt of a resin acid mixture (Dresinate 731, Abieta Chemie GmbH, Gersthofen, Germany, in solution in alkalified water) is metered in over a period of 6 hours. Over the course of the 6 hours, the reaction temperature is raised from 59° C. to 80° C. After a two-hour afterreaction time of 80° C., the graft latex, following addition of about 1.0 part by weight of a phenolic antioxidant, is coagulated using a magnesium sulfate/acetic acid mixture, and, after washing with water, the resulting wet powder is dried at 70° C.

Production of the Molding Compositions

The above-described polymer components a and b are mixed in the proportions indicated in tables 1 to 3, with addition of additives, in a twin-screw extruder at 200 to 250° C., and the mixture is processed to a molding composition.

TABLE 1

15 wt % ABS graft copolymer b (based on polymer mixture A)

| | Molding composition | | | | | | |
|---|---|---|---|---|---|---|---|
| | 1Aa | 1Ba | 1Ca | 1Da | 1Ea | 1Fa | 1Ga |
| b (wt %, based on A) | 15 | 15 | 15 | 15 | 15 | 15 | 15 |
| a1 (wt %, based on A) | 85 | | | | | | 40 |
| a2 (wt %, based on A) | | 85 | | | | | |
| a3 (wt %, based on A) | | | 85 | | | | |
| a4 (wt %, based on A) | | | | 85 | | | |
| a5 (wt %, based on A) | | | | | 85 | | |
| a6 (wt %, based on A) | | | | | | 85 | 45 |
| Irganox 1076 (wt %, based on total molding composition) | 0.2 | 0.2 | 0.2 | 0.2 | 0.2 | 0.2 | 0.2 |
| Irganox PS802 (wt %, based on total molding composition) | 0.3 | 0.3 | 0.3 | 0.3 | 0.3 | 0.3 | 0.3 |

The molding compositions of the invention set out in tables 1 to 3 consist of 99.5 wt % of the polymer mixture A (whose components a and b together make 100 wt %) and 0.5 wt % of the listed additives.

TABLE 2

30 wt % ABS graft copolymer b (based on polymer mixture A)

| | Molding composition | | | | | | |
|---|---|---|---|---|---|---|---|
| | 2Aa | 2Ba | 2Ca | 2Da | 2Ea | 2Fa | 2Ga |
| B | 30 | 30 | 30 | 30 | 30 | 30 | 30 |
| a1 | 70 | | | | | | 35 |
| a2 | | 70 | | | | | |
| a3 | | | 70 | | | | |
| a4 | | | | 70 | | | |
| a5 | | | | | 70 | | |
| a6 | | | | | | 70 | 35 |
| Irganox 1076 | 0.2 | 0.2 | 0.2 | 0.2 | 0.2 | 0.2 | 0.2 |
| Irganox PS802 | 0.3 | 0.3 | 0.3 | 0.3 | 0.3 | 0.3 | 0.3 |

TABLE 3

45 wt % ABS graft copolymer b (based on polymer mixture A)

| | Molding composition | | | | | | |
|---|---|---|---|---|---|---|---|
| | 3Aa | 3Ba | 3Ca | 3Da | 3Ea | 3Fa | 3Ga |
| b | 45 | 45 | 45 | 45 | 45 | 45 | 45 |
| a1 | 55 | | | | | | 25 |
| a2 | | 55 | | | | | |
| a3 | | | 55 | | | | |
| a4 | | | | 55 | | | |
| a5 | | | | | 55 | | |
| a6 | | | | | | 55 | 30 |
| Irganox 1076 | 0.2 | 0.2 | 0.2 | 0.2 | 0.2 | 0.2 | 0.2 |
| Irganox PS802 | 0.3 | 0.3 | 0.3 | 0.3 | 0.3 | 0.3 | 0.3 |

Filaments with a setpoint diameter of 1.78 mm are produced from the resulting molding composition using a single-screw extruder with gear pump, with a nozzle which is diverted downward by 90° and has a nozzle diameter of 2 mm, in a water bath heated at 85° C., with a temperature profile of 210 to 225° C. The quality of the filaments in terms of dimensional consistency was investigated by means of a three-axis laser measuring head for the in-line measurement of the diameter and of the ovality (tables 4 to 6).

TABLE 4

Filament quality measuring series 1 (15 wt % ABS graft copolymer b, based on polymer mixture A)

| Molding composition | Polymer a (MVR/AN-%) | MVR (cm³/10 min) | Mean diameter DM (mm) | DM+ (mm) | DM− (mm) | Ovality (mm) | Remark |
|---|---|---|---|---|---|---|---|
| 1Aa | a1 (55/27) | 55 | 1.780 | +0.038 | −0.032 | 0.027 | |
| 1Ba | a2 (46/19) | 37 | 1.779 | +0.029 | −0.029 | 0.021 | |
| 1Ca | a3 (10/25) | 9 | 1.779 | +0.036 | −0.032 | 0.018 | |
| 1Da | a4 (16/35) | 12 | 1.779 | +0.025 | −0.027 | 0.019 | |
| 1Ea | a5 (61/35) | 43 | 1.780 | +0.032 | −0.036 | 0.026 | |
| 1Fa | a6 (8/30) | 6 | 1.779 | +0.053 | −0.039 | 0.063 | Indentations |
| 1Ga | a1 + a6 | 20 | 1.781 | +0.068 | −0.030 | 0.058 | Indentations |

TABLE 5

Filament quality measuring series 2 (30 wt % ABS graft copolymer, based on polymer mixture A)

| Molding composition | Polymer a (MVR/AN-%) | MVR (cm³/10 min) | Mean diameter DM (mm) | DM+ (mm) | DM− (mm) | Ovality (mm) | Remark |
|---|---|---|---|---|---|---|---|
| 2Aa | a1 (55/27) | 36 | 1.780 | +0.028 | −0.025 | 0.027 | |
| 2Ba | a2 (46/19) | 24 | 1.780 | +0.024 | −0.019 | 0.025 | |
| 2Ca | a3 (10/25) | 6 | 1.779 | +0.035 | −0.047 | 0.018 | |
| 2Da | a4 (16/35) | 8 | 1.779 | +0.029 | −0.021 | 0.020 | |
| 2Ea | a5 (61/35) | 27 | 1.779 | +0.034 | −0.025 | 0.020 | |
| 2Fa | a6 (8/30) | 5 | 1.780 | +0.030 | −0.029 | 0.025 | Indentations |
| 2Ga | a1 + a6 | 15 | 1.781 | +0.035 | −0.035 | 0.029 | |

TABLE 6

Filament quality measuring series 3 (45 wt % ABS graft copolymer, based on polymer mixture A)

| Molding composition | Polymer a (MVR/AN-%) | MVR (cm³/10 min) | Mean diameter DM (mm) | DM+ (mm) | DM− (mm) | Ovality (mm) |
|---|---|---|---|---|---|---|
| 3Aa | a1 (55/27) | 22 | 1.779 | +0.031 | −0.019 | 0.016 |
| 3Ba | a2 (46/19) | 14 | 1.780 | +0.041 | −0.051 | 0.015 |
| 3Ca | a3 (10/25) | 4 | 1.779 | +0.023 | −0.022 | 0.009 |
| 3Da | a4 (16/35) | 5 | 1.778 | +0.023 | −0.021 | 0.010 |
| 3Ea | a5 (61/35) | 16 | 1.780 | +0.026 | −0.018 | 0.015 |
| 3Fa | a6 (8/30) | 2 | 1.779 | +0.037 | −0.035 | 0.028 |
| 3Ga | a1 + a6 | 8 | 1.778 | +0.023 | −0.022 | 0.017 |

Results of the Investigation of Filament Quality

It is found that with the molding compositions of the invention it is possible to obtain very high levels of dimensional integrity on the part of the filaments (DM=1.78 mm +/−0.04 mm, ovality <0.03 mm with virtually all mixtures). The best results in terms of dimensional consistency (DM at most +0.031 mm and at most −0.022 mm, maximum ovality 0.017 mm) are obtained with numerous mixtures which include high fractions (45 wt % as per table 3) of the impact modifier (see table 6).

The greatest dimensional integrity (DM at most +0.023 mm and at most −0.021 mm, maximum ovality 0.010 mm) is achieved with blend 3 Da, containing 45 wt % of ABS graft copolymer (component b) and 55 wt % of component a4.

Fused Deposition Modeling Experiments for Investigating the Extrusion Rate (Tables 7 to 9)

From the molding compositions of the invention, 21 filaments were produced. The maximum conveying speed or extrusion rate was ascertained by conveying 50 mm of filament (filament diameter=1.75 mm) through a nozzle (nozzle diameter=0.4 mm) at different nozzle temperatures (190° C. to 270° C.), by means of a friction wheel controlled by a stepper motor (tables 7 to 9).

TABLE 7

15 wt % ABS graft copolymer (based on polymer mixture A)

| Temperature | Extrusion rate [mm/s] | | | | | | |
|---|---|---|---|---|---|---|---|
| [° C.] | 1Aa | 1Ba | 1Ca | 1Da | 1Ea | 1Fa | 1Ga |
| 190 | 19.1 | 28.7 | 9.6 | 9.6 | 38.3 | 9.6 | 9.6 |
| 200 | 28.7 | 38.3 | 38.3 | 47.9 | 67.0 | 19.1 | 28.7 |
| 210 | 86.1 | 76.6 | 57.4 | 67.0 | 76.6 | 38.3 | 67.0 |
| 220 | 105.3 | 105.3 | 86.1 | 86.1 | 105.3 | 47.9 | 76.6 |
| 230 | 124.4 | 124.4 | 95.7 | 95.7 | 114.8 | 76.6 | 95.7 |
| 240 | 134.0 | 134.0 | 105.3 | 105.3 | 134.0 | 86.1 | 105.3 |
| 250 | 153.1 | 143.6 | 124.4 | 114.8 | 153.1 | 95.7 | 124.4 |
| 260 | 162.7 | 162.7 | 134.0 | 134.0 | 162.7 | 105.3 | 134.0 |
| 270 | 181.8 | 172.3 | 143.6 | 143.6 | 172.3 | 124.4 | 143.6 |

TABLE 8

30 wt % ABS graft copolymer (based on polymer mixture A)

| Temperature | Extrusion rate [mm/s] | | | | | | |
|---|---|---|---|---|---|---|---|
| [° C.] | 2Aa | 2Ba | 2Ca | 2Da | 2Ea | 2Fa | 2Ga |
| 190 | 47.9 | 47.9 | 9.6 | 9.6 | 19.1 | 6.4 | 6.4 |
| 200 | 67.0 | 67.0 | 28.7 | 19.1 | 38.3 | 9.6 | 28.7 |
| 210 | 86.1 | 76.6 | 47.9 | 47.9 | 47.9 | 28.7 | 38.3 |
| 220 | 95.7 | 95.7 | 67.0 | 57.4 | 67.0 | 38.3 | 57.4 |
| 230 | 105.3 | 105.3 | 76.6 | 67.0 | 76.6 | 57.4 | 67.0 |
| 240 | 124.4 | 114.8 | 86.1 | 76.6 | 86.1 | 67.0 | 76.6 |
| 250 | 143.6 | 124.4 | 105.3 | 86.1 | 105.3 | 86.1 | 95.7 |
| 260 | 153.1 | 134.0 | 114.8 | 105.3 | 124.4 | 95.7 | 105.3 |
| 270 | 162.7 | 143.6 | 124.4 | 114.8 | 134.0 | 105.3 | 114.8 |

TABLE 9

45 wt % ABS graft copolymer (based on polymer mixture A)

| Temperature | Extrusion rate [mm/s] | | | | | | |
|---|---|---|---|---|---|---|---|
| [° C.] | 3Aa | 3Ba | 3Ca | 3Da | 3Ea | 3Fa | 3Ga |
| 190 | 38.3 | 19.1 | 6.4 | 9.6 | 19.1 | 6.4 | 9.6 |
| 200 | 57.4 | 28.7 | 19.1 | 28.7 | 28.7 | 9.6 | 19.1 |
| 210 | 76.6 | 38.3 | 47.9 | 38.3 | 47.9 | 19.1 | 38.3 |
| 220 | 95.7 | 57.4 | 57.4 | 57.4 | 57.4 | 38.3 | 57.4 |
| 230 | 105.3 | 76.6 | 67.0 | 76.6 | 76.6 | 57.4 | 67.0 |
| 240 | 114.8 | 95.7 | 76.6 | 86.1 | 95.7 | 67.0 | 76.6 |
| 250 | 124.4 | 114.8 | 95.7 | 95.7 | 105.3 | 76.6 | 86.1 |
| 260 | 143.6 | 124.4 | 114.8 | 105.3 | 114.8 | 86.1 | 105.3 |
| 270 | 153.1 | 134.0 | 124.4 | 114.8 | 124.4 | 95.7 | 114.8 |

Results

For a nozzle temperature of 240° C., high extrusion rates of at least 60 mm/s are achieved with all molding compositions of the invention. The best results are obtained with the molding compositions of the invention that comprise 15 wt % of the ABS graft copolymer content and 85 wt % of a SAN copolymer (based in each case on polymer mixture A) (table 7). At 240° C., extrusion rates of more than 100 mm/s are achieved for all such filaments of the invention; in the case of molding compositions 1Aa, 1Ba, and 1Ea, indeed, extrusion rates of 134 mm/s are attained.

Investigation of Print Quality

FDM experiments with 21 filaments made from the molding compositions of the invention

TABLE 10

| 3D printer | Reconstruction based on Ultimaker 1 |
|---|---|
| Slicer | CuraEngine |
| Interface | Pronterface |
| Nozzle diameter | 0.4 mm |
| Wall thickness | 600-700 μm (width of extruded strand) |
| Nozzle temperature | 240° C. |
| Printing bed | Aluminum + polyimide (Kapton) |
| Printing bed temperature | 135° C. |
| Building space temperature | about 40° C. to 55° C. |
| Sample shape | Bayreuth cube edge length 50 mm |
| Layer thickness | 0.25 mm |
| Moving mode | Spiral |
| Printing speed | 12.5 mm/s |
| Ventilator | Off |

FIG. 1 shows the shape of a Bayreuth cube. The Bayreuth cube is a hollow cube with four side faces S, E, N, and W, without base faces.

The FDM method was used to produce such Bayreuth cubes from the molding compositions of the invention. The production conditions are evident from table 10.

Print quality was assessed by determining the warpage, the dimensional stability, the ply or layer adhesion, the contact area between the layers, the bed adhesion, and the stringing; also determined were depositions of material; these determinations were carried out on the three-dimensional molding (Bayreuth cube).

A visual control (inspection) was used to assess the warpage, the stringing, and depositions of material.

For the printing quality of the Bayreuth cube obtained by 3D printing from the molding compositions of the invention, quality criteria were as follows:

Dimensional stability in X and Y direction: deviation<1.5%

Stringing/deposition of material: rating scale in each case from zero to 1, with 1 being good (no stringing or no deposition of material) and 0 being poor.

Tensile test for layer adhesion: at least 80% of the strength of an injection- or compression-molded dumbbell specimen Bed adhesion: rating scale from zero to 1, i.e., 1 (good)= no detachment from printing bed, zero (poor)

Results:

All of the molding compositions of the invention produced Bayreuth cubes which are distinguished by good layer adhesion, meaning that at least 80% of the strength of an injection-molded dumbbell specimen is achieved, and by a large contact area between the layers.

Particularly good print quality in respect of all the above-mentioned criteria was obtained with molding compositions of the invention containing polymers a2, a3, and a4; the best results were obtained with the molding composition 1Da of the invention, this being a molding composition containing polymer a4 and an ABS graft copolymer b with a fraction of 15 wt % (based on polymer mixture A).

Features of these printed moldings made from molding compositions a2, a3, and a4 are that the criteria of stringing/deposition of material and of bed adhesion were each given a rating of 1; the dimensional stability in X and Y direction is very good and exhibits a deviation of less than 1.5%; and the tensile test for layer adhesion shows that at least 80% of the strength of an injection- or compression-molded dumbbell specimen is reached.

The invention claimed is:

1. A thermoplastic molding composition for 3D printing, comprising a polymer mixture A composed of components a and b:
   a: 30 to 95 wt % of at least one polymer a having an average molar mass Mw of 150 000 to 360 000 g/mol, selected from:
   vinylaromatic copolymers selected from the group consisting of: styrene-acrylonitrile copolymers, α-methylstyrene-acrylonitrile copolymers, styrene-maleic anhydride copolymers, styrene-phenylmaleimide copolymers, styrene-methyl methacrylate copolymers, styrene-acrylonitrile-maleic anhydride copolymers, styrene-acrylonitrile-phenylmaleimide copolymers, α-methylstyrene-acrylonitrile-methyl methacrylate copolymers, α-methylstyrene-acrylonitrile-tert-butyl methacrylate copolymers, and styrene-acrylonitrile-tert-butyl methacrylate copolymers, and
   b: 5 to 70 wt % of at least one impact modifier b, built up from components b1 and b2:
   b1: 20-90 wt % of a graft base made from one or more monomers, consisting of:
   b11: 70 to 100 wt % of at least one conjugated diene, and
   b12: 0 to 30 wt % of styrene, and,
   b2: 10 to 80 wt % of a graft made from one or more monomers, consisting of:
   b21: 65 to 95 wt % of at least one vinylaromatic monomer,
   b22: 5 to 35 wt % of acrylonitrile and/or methacrylonitrile, and
   b23: 0 to 30 wt % of at least one further monoethylenically unsaturated monomer selected from: MMA, MAN, and N-PMI;
   where the sum of components a and b totals 100 wt %, characterized in that the viscosity (measured to ISO 11443) of the molding composition at shear rates of 1 to 10 1/s and at temperatures of 250° C. is not higher than $1\times10^5$ Pa*s and the melt volume rate (MVR, measured to ISO 1133 at 220° C. and 10 kg load) is more than 6 ml/10 min;
   wherein the residual monomer content is not more than 2000 ppm and the solvent content is not more than 1000 ppm; and
   the impact modifier b has a trimodal particle size distribution and is a mixture of ABS graft copolymers b', b", and b'" where the graft base b1' of the ABS graft polymer b' has an average particle diameter $d_{50}$ of 25 to 200 nm, the graft base b1" of the ABS graft copolymer b" has an average particle diameter $d_{50}$ of 230 to 330 nm, and the graft base b1'" of the ABS graft copolymer b'" has an average particle diameter $d_{50}$ of 340 to 480 nm.

2. The molding composition as claimed in claim 1, characterized in that additionally there is
   at least one further polymer b, selected from polycarbonates, polyamides, poly(meth)acrylates, polyesters, and styrene-butadiene block copolymers; and/or
   customary additives; and/or
   auxiliaries c.

3. The molding composition as claimed in claim 1, characterized in that at least half of the polymers present in the molding composition are amorphous polymers.

4. The molding composition as claimed in claim 1, comprising:
   40 to 100 wt % of polymer mixture a,
   0 to 60 wt % of polymer b, and
   0 to 40 wt % of minerals as auxiliaries c,
   based in each case on the overall molding composition, and where the sum of a, b and c is 100 wt %.

5. The molding composition as claimed in claim 1, characterized in that the particle size of the impact modifier b is at least 50 nm and at most 10 μm.

6. The molding composition as claimed in claim 1, characterized in that polymer a is a styrene-acrylonitrile copolymer (SAN) comprising 18 to 35 wt % acrylonitrile and 82 to 65 wt % styrene.

7. The molding composition as claimed in claim 1, characterized in that the impact modifier b has bimodal, trimodal or multimodal particle size distributions.

8. The molding composition as claimed in claim 1, characterized in that the impact modifier b is an ABS impact modifier b built up from:
   b1: 40 to 90 wt % of a graft base consisting of:
   b11: 70 to 100 wt % of butadiene, and
   b12: 0 to 30 wt % of styrene, and
   b2: 10 to 60 wt % of a graft consisting of:
   b21: 65 to 95 wt % of styrene,
   b22: 5 to 35 wt % of acrylonitrile, and
   b23: 0 to 30 wt % of MMA.

9. The molding composition as claimed in claim 1, characterized in that in the polymer mixture A, the fraction of the polymer a is 75 to 95 wt % and the fraction of the impact modifier b is 5 to 25 wt %.

10. The molding composition as claimed in claim 1, characterized in that in the polymer mixture A, the fraction of the polymer a is 65 to 95 wt % and the fraction of the impact modifier b is 5 to 35 wt %.

11. The molding composition as claimed in claim 1, characterized in that in the polymer mixture A, the fraction of the polymer a is 30 to 60 wt % and the fraction of the impact modifier b is 40 to 70 wt %.

12. The molding composition as claimed in claim 1, characterized in that the coefficient of linear thermal expansion is less than $100\times10^{-6}$ 1/K.

13. The molding composition as claimed in claim 1, characterized in that the transition metal content is not more than 500 ppm.

14. A method of 3D printing comprising the step of extruding the molding composition as claimed in claim 1 to produce an object.

15. A method of 3D printing comprising the step of extruding the molding composition as claimed in claim 11 to produce a filament.

16. A method of 3D printing comprising the step of extruding the molding composition as claimed in claim 1 to produce an object for home application.

17. A method for producing 3-dimensional moldings from the molding composition as claimed in claim 1 by fused deposition modeling, where, in a 3D printer with a heating nozzle freely movable in the fabrication plane, a supplied filament of the molding composition is fluidized, and the fluidized molding composition is extruded, applied layer by layer, and consolidated.

18. The method as claimed in claim 17, characterized in that filaments of the molding composition melted in a 3D printer having a heating nozzle diameter of 0.3 to 0.8 mm at a nozzle temperature of 200 to 270° C., and the melted molding composition is extruded at an extrusion rate of 60 to 180 mm/s.

19. A method for determining the print quality of a 3-dimensional molding produced as claimed in claim 17, characterized in that the ratio of the width of the extruded strand to minimum edge length or of the width of the extruded strand to minimum diameter of the 3-dimensional molding is at least 1:20.

\* \* \* \* \*